US010180066B2

(12) United States Patent
Liu

(10) Patent No.: US 10,180,066 B2
(45) Date of Patent: Jan. 15, 2019

(54) METHOD FOR DIRECTIONALLY SWAYING AND RESETTING HARROW TEETH OF ROLLING HARROW LOADER-EXCAVATOR AND ROLLING HARROW LOADER-EXCAVATOR WITH DIRECTIONAL SWAY AND RESET HARROW TEETH FOR IMPLEMENTING SUCH METHOD

(71) Applicant: Suhua Liu, Shandong (CN)

(72) Inventor: Suhua Liu, Shandong (CN)

( * ) Notice: Subject to any disclaimer, the term of this patent is extended or adjusted under 35 U.S.C. 154(b) by 442 days.

(21) Appl. No.: 15/030,889

(22) PCT Filed: Oct. 21, 2014

(86) PCT No.: PCT/CN2014/000929
§ 371 (c)(1),
(2) Date: Apr. 21, 2016

(87) PCT Pub. No.: WO2015/058466
PCT Pub. Date: Apr. 30, 2015

(65) Prior Publication Data

US 2016/0265357 A1 Sep. 15, 2016

(30) Foreign Application Priority Data

Oct. 21, 2013 (CN) .......................... 2013 1 0492936
Nov. 26, 2013 (CN) .......................... 2013 1 0601557
(Continued)

(51) Int. Cl.
*A01B 33/14* (2006.01)
*E21C 35/20* (2006.01)
(Continued)

(52) U.S. Cl.
CPC .............. *E21C 35/20* (2013.01); *E02F 3/181* (2013.01); *E02F 3/245* (2013.01); *E02F 3/966* (2013.01);
(Continued)

(58) Field of Classification Search
CPC .................................................... A01B 33/144
(Continued)

(56) References Cited

U.S. PATENT DOCUMENTS 2,164,639 A * 7/1939 Brower .................... A01C 7/06 111/138
2,182,260 A * 12/1939 Kovar .................... A01B 19/10 172/390
5,715,892 A * 2/1998 Foster .................... A01B 35/18 172/200

FOREIGN PATENT DOCUMENTS

CN 101050703 A 10/2007
CN 102677712 A 9/2012
(Continued)

OTHER PUBLICATIONS

International Search Report for PCT/CN2014/000929—the whole document, dated Jan. 2015.

*Primary Examiner* — Sunil Singh

(57) ABSTRACT

The method for directionally swaying and resetting harrow teeth of a rolling harrow loader-excavator and the rolling harrow loader-excavator comprising a harrow rotary piece, directional sway and reset harrow teeth, a harrow supporter, a driving mechanism, a feeder mechanism and a body; each directional sway and reset harrow tooth comprises a torsion spring shaft supporting piece, a tooth handle sway limiting piece, a directional sway and reset tooth handle, a directional sway and reset tooth point, a torsion spring tooth handle shaft, a torsion spring and a torsion spring tooth handle shaft retaining piece.

15 Claims, 13 Drawing Sheets

A-A 12 8 14 13 45 11 9 16 1 6 15

(30) Foreign Application Priority Data

| | | |
|---|---|---|
| Jan. 29, 2014 | (CN) | 2014 1 0042606 |
| Jun. 15, 2014 | (CN) | 2014 1 0281255 |
| Jun. 26, 2014 | (CN) | 2014 1 0318364 |
| Aug. 1, 2014 | (CN) | 2014 1 0379365 |

(51) Int. Cl.

| | |
|---|---|
| ***E02F 3/24*** | (2006.01) |
| ***E02F 5/08*** | (2006.01) |
| ***E21C 27/46*** | (2006.01) |
| ***E02F 3/18*** | (2006.01) |
| ***E02F 3/96*** | (2006.01) |
| ***E02F 5/30*** | (2006.01) |

(52) U.S. Cl.

CPC ................ *E02F 5/08* (2013.01); *E02F 5/305* (2013.01); *E21C 27/46* (2013.01); *A01B 33/144* (2013.01)

(58) Field of Classification Search

USPC ............. 172/545, 546; 111/145, 146; 301/51

See application file for complete search history.

(56) References Cited

FOREIGN PATENT DOCUMENTS

| | | | |
|---|---|---|---|
| CN | 103103996 | A | 5/2013 |
| CN | 201310492936.6 | A | 4/2015 |
| CN | 201310601557.6 | A | 4/2015 |
| CN | 201410042606.1 | A | 4/2015 |
| CN | 201410281255.X | A | 4/2015 |
| CN | 201410318364.4 | A | 4/2015 |
| CN | 201410379365.X | A | 4/2015 |
| FR | 2267265 | B2 | 9/1978 |
| SU | 564417 | A1 | 11/1977 |

* cited by examiner

METHOD FOR DIRECTIONALLY SWAYING AND RESETTING HARROW TEETH OF ROLLING HARROW LOADER-EXCAVATOR AND ROLLING HARROW LOADER-EXCAVATOR WITH DIRECTIONAL SWAY AND RESET HARROW TEETH FOR IMPLEMENTING SUCH METHOD

FIELD OF THE INVENTION

The present invention belongs to the field of machinery and particularly relates to a method for directionally swaying and resetting harrow teeth of a rolling harrow loader-excavator and a rolling harrow loader-excavator with directional sway and reset harrow teeth for implementing such a method.

BACKGROUND OF THE INVENTION

Rolling harrow loaders and rolling harrow loading excavators are collectively known as rolling harrow loader-excavators; the rolling harrow loader-excavators are capable of continuously loading materials through rolling harrowing of rolling harrows; the loading efficiency is greatly improved, and continuous, uniform, reasonable and efficiency work is realized from a working principle. However, materials are often clamped between harrow teeth of the rolling harrow loader-excavators and baffle plates on upper side portions of shoving plates or rolling harrow supporting arms or reciprocating impact power boxes; when the harrow teeth harrow large materials to reciprocating impact power box bodies or the rolling harrow supporting arms, the large materials are clamped between the harrow teeth and the reciprocating impact power box bodies or the rolling harrow supporting arms and thus unable to pass through, leading to that the harrow teeth damp rolling harrow rotary pieces to rotate, and in this case, the use efficiency and applicability of the rolling harrow loader-excavators are affected heavily, and even worse, shutdown is caused. To solve the problems, the invention provides a method for directionally swaying and resetting harrow teeth of a rolling harrow loader-excavator and a rolling harrow loader-excavator with directional sway and reset harrow teeth for implementing such a method.

SUMMARY OF THE INVENTION

The invention provides a rolling harrow loader-excavator with directional sway and reset harrow teeth, characterized by comprising a harrow rotary piece, directional sway and reset harrow teeth, a harrow supporter, a driving mechanism, a feeder mechanism, a body and the like; each directional sway and reset harrow tooth comprises a torsion spring shaft supporting piece, a tooth handle sway limiting piece, a directional sway and reset tooth handle, a directional sway and reset tooth point, a torsion spring tooth handle shaft, a torsion spring, a torsion spring tooth handle shaft retaining piece and the like, wherein the directional sway and reset tooth handle and the like are arranged on a lower portion of the directional sway and reset tooth point; the torsion spring shaft supporting piece and the like are arranged on the rolling harrow rotary piece; the tooth handle sway limiting piece and the like are arranged on the torsion spring shaft supporting piece close to a position of the rolling harrow supporter; a tooth handle rotary hole piece and the like are arranged on the directional sway and reset tooth handle; the torsion spring and the like are arranged in the torsion spring shaft supporting piece; the torsion spring, the tooth handle rotary hole piece and the like are connected, by using the torsion spring tooth handle shaft, to the torsion spring shaft supporting piece in a penetrating manner; the torsion spring tooth handle shaft is positioned on the torsion spring shaft supporting piece by using the torsion spring tooth handle shaft retaining piece; a fixed end of the torsion spring is arranged on the tooth handle sway limiting piece or the torsion spring shaft supporting piece, while a movable end of the torsion spring is arranged on the directional sway and reset tooth handle; a tooth point sway limiting piece and the like are arranged on one side of the directional sway and reset tooth handle; the tooth handle sway limiting piece and the tooth point sway limiting piece limit each other to prevent the directional sway and reset tooth point from swaying towards a space other than a limiting position of the provided tooth handle sway limiting piece; the rolling harrow rotary piece is hinged to the rolling harrow supporter; the rolling harrow supporter and the like are arranged on the body; the feeder mechanism and the like are arranged on the body; the driving mechanism drives the rolling harrow rotary piece and the like to rotate; when materials are clamped between the rolling harrow supporter and the directional sway and reset harrow teeth, the directional sway and reset harrow teeth and the like continue to rotate, and a rotating force drives each tooth handle rotary hole piece and the like to rotate about the corresponding torsion spring tooth handle shaft and simultaneously drives the movable end of the corresponding torsion spring and the like to move, so that the corresponding directional sway and reset tooth point and the like rotate in a direction away from the harrow supporter, and the clamped materials fall off; and when the directional sway and reset harrow teeth and the like rotate and leave a material clamping position between the directional sway and reset harrow teeth and the harrow supporter, the movable end of the torsion spring restores and resets the directional sway and reset tooth point and the like, and then the directional sway and reset harrow teeth and the like continue to rotate for harrowing materials.

The invention further includes a method for directionally swaying and resetting harrow teeth of a rolling harrow loader-excavator. The method is implemented through the following steps:

step 1: arranging a torsion spring shaft supporting piece and the like on a rolling harrow rotary piece and arranging a tooth handle sway limiting piece and the like on the torsion spring shaft supporting piece next to a position of a rolling harrow supporter;

step 2: arranging a directional sway and reset tooth handle and the like on a lower portion of a directional sway and reset tooth point;

step 3: arranging a tooth handle rotary hole piece and the like on the directional sway and reset tooth handle, connecting a torsion spring, the tooth handle rotary hole piece and the like to the torsion spring shaft supporting piece in a penetrating manner by using a torsion spring tooth handle shaft, limiting the torsion spring tooth handle shaft and the like on the torsion spring shaft supporting piece by using a torsion spring tooth handle shaft retaining piece, arranging a fixed end of the torsion spring on the tooth handle sway limiting piece or the torsion spring shaft supporting piece or the like, and arranging a movable end of the torsional spring on the directional sway and reset tooth handle;

step 4: arranging a tooth point sway limiting piece for mutually limiting the tooth handle sway limiting piece and the like on the directional sway and reset tooth handle, wherein the tooth handle sway limiting piece and the tooth point sway limiting piece limit each other to prevent the directional sway and reset tooth point and the like from swaying towards a space other than a limiting position of the tooth handle sway limiting piece; and step 5: hinging the rolling harrow rotary piece to the rolling harrow supporter, arranging the rolling harrow supporter and the like on a body, arranging a feeder mechanism and the like on the body, and enabling a driving mechanism to drive the rolling harrow rotary piece and the like to rotate, wherein when materials are clamped between the rolling harrow supporter and the directional sway and reset harrow teeth, the directional sway and reset harrow teeth and the like continue to rotate, and a rotating force drives each tooth handle rotary hole piece and the like to rotate about the corresponding torsion spring tooth handle shaft and simultaneously drives the movable end of the corresponding torsion spring to move, so that the corresponding directional sway and reset tooth point and the like rotate in a direction away from the harrow supporter, and the clamped materials fail off; the directional sway and reset harrow teeth and the like continue to rotate, and when the directional sway and reset harrow teeth and the like rotate and leave a material clamping position between the directional sway and reset harrow teeth and the harrow supporter, the movable end of each torsion spring restores and resets each directional sway and reset tooth point for continuously harrowing materials.

A second method:

Included are: arranging a torsion spring pretension force adjusting block and the like, forming torsion spring pretension force adjusting threads and the like on each directional sway and reset tooth handle, enabling a torsion spring pretension force adjusting screw to penetrate through the torsion spring pretension force adjusting threads, the torsion spring pretension force adjusting block and the like, closely affixing the torsion spring pretension force adjusting block to the movable end or the fixed end of the corresponding torsion spring, and rotating the torsion spring pretension force adjusting screw such that the torsion spring pretension force adjusting block moves along the torsion spring pretension force adjusting screw, leading to that an elastic force of the movable end of the torsion spring is suitable for swaying and resetting the corresponding directional sway and reset tooth point to one side.

The directional sway and reset tooth handle comprises a torsion spring pretension force adjusting block, torsion spring pretension force adjusting threads, a torsion spring pretension force adjusting screw and the like; the torsion spring pretension force adjusting screw penetrates through the torsion spring pretension force adjusting threads, the torsion spring pretension force adjusting block and the like; the torsion spring pretension force adjusting block is closely affixed to the movable end or the fixed end of the torsion spring or the like; the torsion spring pretension force adjusting screw is rotated to enable the torsion spring pretension force adjusting block to move along the torsion spring pretension force adjusting screw, such that an elastic force of the movable end of the torsion spring is suitable for swaying and resetting the directional sway and reset tooth point towards one side.

A torsion spring positioning sleeve and the like are arranged between the torsion spring tooth handle shaft and the torsion spring, and the torsion spring is arranged on the torsion spring positioning sleeve.

The body comprises a shoveling plate and the like; the shoveling plate comprises a baffle plate on an upper side portion thereof and the like; a sway plane of each directional sway and reset tooth point is arranged relatively perpendicular to the baffle plate on the upper side portion of the shoveling plate; and when materials are clamped between the baffle plate on the upper side portion of the shoveling plate and the directional sway and reset harrow teeth, each directional sway and reset tooth point sways in a direction away from the baffle plate on the upper side portion of the shoveling plate.

A cambered retainer ring and the like are arranged on the rolling harrow supporter; a tooth point sway limiting pin and the like are arranged on each directional sway and reset tooth point and rotate along with the directional sway and reset tooth point and the like; when the directional sway and reset harrow teeth and the like rotate into a material clamping interval between the directional sway and reset tooth points and the rolling harrow supporter, the tooth point sway limiting pins leave the cambered retainer ring and the like, the directional sway and reset tooth points sway in a direction away from the rolling harrow supporter and the clamped materials fall off and when the directional sway and reset harrow teeth rotate and leave the material clamping interval between the directional sway and reset tooth points and the rolling harrow supporter, the tooth point sway limiting pins and the like rotate into the cambered retainer ring to prevent the directional sway and reset tooth points and the like from swaying in the direction away from the rolling harrow supporter, and the cambered retainer ring controls a harrowing direction of the directional sway and reset tooth points and the like such that the directional sway and reset tooth points keep a rigid state while harrowing materials downwards.

A roller or tooth point sway limiting pin shaft sleeve or bearing and the like are arranged on each tooth point sway limiting pin; and when the tooth point sway limiting pin rotates into the cambered retainer ring, the roller or tooth point sway limiting pin shaft sleeve or bearing and the like roll in a frictional motion manner along the cambered retainer ring.

The rolling harrow supporter is hinged to the body by using a supporter hinge shaft and the like; when the directional sway and reset harrow teeth harrow relatively large materials and hardly harrow the materials into the feeder mechanism, the directional sway and reset harrow teeth and the like are lifted up by the materials and the rolling harrow supporter and the like are lifted up by the directional sway and reset harrow teeth, and then the rolling harrow supporter and the like rotate around the supporter hinge shaft to prevent the large materials from damaging the directional sway and reset harrow teeth and the driving mechanism.

A length of the directional sway and reset harrow teeth is greater than or equal to a diameter of the rolling harrow rotary piece.

The rolling harrow supporter includes a rolling harrow loading-excavation supporter or a reciprocating impacting rolling harrow loading and transporting supporter and the like; the reciprocating impacting rolling harrow loading and transporting supporter comprises a reciprocating impact head, an impact power box and the like; the impact power box comprises a reciprocating impact box body, a reciprocating impact power piece, a reciprocating impact guiding piece and the like; the reciprocating impact power piece is arranged in the reciprocating impact box body and connected with the driving mechanism; the reciprocating impact box body supports the reciprocating impact power piece, the reciprocating impact guiding piece and the like; the reciprocating impact head is arranged on the reciprocating impact guiding piece extending out of the reciprocating impact box body; the reciprocating impact power piece drives the reciprocating impact guiding piece and the like; the reciprocating impact guiding piece drives the reciprocating impact head to impact falling materials in a reciprocating manner; the rolling harrow rotary piece is arranged on a lower portion of a side surface of the reciprocating impact box body; one or two ends of the rolling harrow rotary piece are arranged outside the reciprocating impact box body; the directional sway and reset harrow teeth are arranged on the rolling harrow rotary piece outside the reciprocating impact box body; the rolling harrow rotary piece drives the directional sway and reset harrow teeth to rotate, etc; the directional sway and reset harrow teeth rotate and extend out of a surface of the reciprocating impact box to harrow and transport materials impacted off by the reciprocating impact head to the feeder mechanism; the reciprocating impact power piece includes a crank connecting link power piece, a hydraulic power piece, a pneumatic power piece or the like.

The crank connecting link power piece comprises a falling and harrowing crank and the like; a rolling harrow driver and the like are arranged on the falling and harrowing crank; the rolling harrow driver is arranged on the falling and harrowing crank within the reciprocating impact box body or on an end portion of the falling and harrowing crank outside the reciprocating impact box body or the like; the rolling harrower driver comprises a belt driver, a chain wheel driver, a gear driver or the like; the rolling harrow driver drives the rolling harrow rotary piece and the like to rotate and the rolling harrow rotary piece drives the directional sway and reset tooth points and the like to rotate for harrowing materials; when materials are clamped between the reciprocating impact box body and one directional sway and reset tooth point, the directional sway and reset tooth point and the like continue to rotate, and a rotating force drives the directional sway and reset tooth point and the like, and the directional sway and reset tooth point drives the movable end of the corresponding torsion spring and the like to move, such that the movable end of the torsion spring sways in a direction away from the reciprocating impact box body; when the directional sway and reset tooth point sways and leaves a material clamping position between the directional sway and reset tooth point and the reciprocating impact box body, the movable end of the torsion spring, restores and resets the directional sway and reset tooth point and the like, and the directional sway and reset tooth point and the like continue to rotate for harrowing materials.

A harrow tooth directional-rotating clutch is arranged between the falling and harrowing crank and the rolling harrow driver, or between the rolling harrow rotary piece and the directional sway and reset harrow teeth, or between the rolling harrow rotary piece and the rolling harrow driver or on the rolling harrow driver, etc.; when the falling and harrowing crank rotates in a direction to drive the directional sway and reset harrow teeth to harrow materials, the harrow tooth directional-rotating clutch transfers power to the directional sway and reset harrow teeth and the like such that the directional sway and reset harrow teeth rotate to harrow materials; and when a rotating direction of the falling and harrowing crank is opposite to a harrowing direction of the directional sway and reset harrow teeth, the harrow tooth directional-rotating clutch stops transferring power to the directional sway and reset harrow teeth such that the directional sway and reset harrow teeth are in a state of rest.

A harrow tooth holder and the like are arranged on the rolling harrower supporter, the harrow tooth holder comprises a harrow tooth support claw, a support claw supporting shaft, a support claw limiting piece and the like; the support claw supporting shaft, the support claw limiting piece and the like are arranged on the reciprocating impact box body of the impact power box; the harrow tooth support claw is hinged to the support claw supporting shaft; the support claw limiting piece limits the rotating harrow tooth support claw; when the directional sway and reset harrow teeth rotate and harrow materials, the directional sway and reset harrow teeth smoothly rotate and harrow materials through the harrow tooth support claw after the harrow tooth support claw and the like are lifted up a certain angle by the directional sway and reset harrow teeth; and when the directional sway and reset harrow teeth and the like move in a direction opposite to a rotating and harrowing direction, the harrow tooth support claw is limited by the support claw limiting piece to lift up the directional sway and reset harrow teeth and the like, and the directional sway and reset harrow teeth are in the state of rest.

The support claw limiting piece comprises a support claw falling limiting piece, a support claw upturning limiting piece and the like, which are arranged on the reciprocating impact box body; the support claw falling limiting piece prevents the harrow tooth support claw from falling off, while the support claw upturning limiting piece prevents the harrow tooth support claw from rotating to a position where the support claw falling limiting piece is unable to lift up the rolling harrow support claw; the support claw falling limiting piece and the support claw upturning limiting piece are arranged separately or integrally.

The reciprocating impact controller driving mechanism comprises a reciprocating impact driving piece and the like; the rolling harrow supporter includes the rolling harrow loading-excavation supporter, the reciprocating impacting rolling harrow loading and transporting supporter or the like; the reciprocating impacting rolling harrow loading and transporting supporter comprises the reciprocating impact head, the impact power box and the like; the impact power box comprises the reciprocating impact box body, the reciprocating impact power piece and the like; the reciprocating impact power piece comprises a crank, a connecting link, the reciprocating impact guiding piece, a guiding supporting wheel, a reciprocating impact power transmission piece and the like; the reciprocating impact box body supports the guiding supporting wheel; the guiding supporting wheel supports the reciprocating impact guiding piece; the reciprocating impact driving piece drives the reciprocating impact power transmission piece that drives the crank, and the crank drives the connecting link that drives the reciprocating impact guiding piece to reciprocate; the reciprocating impact guiding piece extends out of the reciprocating impact box body and drives the reciprocating impact head to impact falling materials in a reciprocating manner; the reciprocating impact box body supports the reciprocating impact power transmission piece, the crank and the like; the reciprocating impact driving piece drives the reciprocating impact power transmission piece that drives the crank to rotate; the harrowing roller driving mechanism further comprises a harrowing driving piece, a harrowing transmission piece and the like; the rolling harrow rotary piece is arranged on a lower portion of a side surface of the reciprocating impact box body; a reciprocating impact transmission harrowing power piece is arranged on the reciprocating impact power transmission piece; the harrowing driving piece drives the reciprocating impact transmission harrowing power piece that drives the harrowing transmission piece; the reciprocating impact transmission harrowing power piece and the harrowing transmission piece drive the rolling harrow rotary piece to rotate, and the rolling harrow rotary piece drives the directional sway and reset harrow teeth to harrow materials; the rolling harrow rotary piece drives the directional sway and reset harrow teeth to rotate, such that the directional sway and reset harrow teeth rotate and extend out of the surface of the reciprocating impact box body to harrow and transport materials impacted off by the reciprocating impact head to the feeder mechanism; the harrowing driving piece is integrated with the reciprocating impact driving piece, and includes a motor driving piece, a hydraulic driving piece, a pneumatic driving piece or the like.

The invention has the following beneficial effects:

The rolling harrow loader-excavator with the directional sway and reset harrow teeth provided by the present invention has the following advantages:

1. The torsion spring shaft supporting piece is arranged on the rolling harrow rotary piece; the tooth handle sway limiting piece is arranged on the torsion spring shaft supporting piece close to the position of the rolling harrow supporter; the tooth handle rotary hole piece is arranged on the directional sway and reset tooth handle; the torsion spring and the tooth handle rotary hole piece are connected to the torsion spring shaft supporting piece in the penetrating manner by using the torsion spring tooth handle shaft; the torsion spring tooth handle shaft is limited on the torsion spring shaft supporting piece by using the torsion spring tooth handle shaft retaining piece; the fixed end of the torsion spring is arranged on the tooth handle sway limiting piece or a torsion spring shaft supporter, while the movable end of the torsion spring is arranged on the directional sway and reset tooth handle; the tooth point sway limiting piece for mutually limiting the tooth handle sway limiting piece is arranged on the directional sway and reset tooth handle; the tooth handle sway limiting piece and the tooth point sway limiting piece limit each other to prevent the directional sway and reset tooth point from swaying towards a space other than the limiting position of the tooth handle sway limiting piece; the rolling harrow rotary piece is hinged to the rolling harrow supporter, such that the driving mechanism drives the rolling harrow rotary piece to rotate; when materials are clamped between the rolling harrow supporter and the directional sway and reset harrow teeth, the directional sway and reset harrow teeth continue to rotate, and the rotating force drives each tooth handle rotary hole piece to rotate about the corresponding torsion spring tooth handle shaft and simultaneously drives the movable end of the corresponding torsion spring to move, so that the corresponding directional sway and reset tooth point rotates in a direction away from the harrow supporter, and the clamped materials fall off; and when the directional sway and reset harrow teeth rotate and leave the material clamping position between the directional sway and reset harrow teeth and the harrow supporter, the movable end of the torsion spring restores and resets the directional sway and reset tooth point; as a result, the rolling harrow rotary piece, the directional sway and reset harrow teeth, the rolling harrow supporter, the driving mechanism and the like are not damaged due to material clamping between the rolling harrow supporter and the directional sway and reset tooth points, and the directional sway and reset harrow teeth are enabled to work continuously; in short, the harrowing efficiency is improved.

2. The torsion spring positioning sleeve is arranged between the torsion spring tooth handle shaft and the torsion spring, and the torsion spring is arranged on the torsion spring positioning sleeve; hence, a spiral hole of the torsion spring is enlarged and the elastic force of the torsion spring is enhanced.

3. The torsion spring pretension force adjusting threads are formed on the directional sway and reset tooth handle; the torsion spring pretension force adjusting screw is enabled to penetrate through the torsion spring pretension force adjusting threads and the torsion spring pretension force adjusting block; the torsion spring pretension force adjusting block is closely affixed to the movable end or the fixed end of the torsion spring; the torsion spring pretension force adjusting screw is rotated to enable the torsion spring pretension force adjusting block to move along the torsion spring pretension force adjusting screw, such that the elastic force of the movable end of the torsion spring is suitable for swaying and resetting the directional sway and reset tooth point towards one side.

4. The sway plane of the directional sway and reset tooth point is arranged relatively perpendicular to the baffle plate on the upper side portion of the shoveling plate; and when materials are clamped between the baffle plate on the upper side portion of the shoveling plate and the directional sway and reset harrow teeth, each directional sway and reset tooth point sways in a direction away from the baffle plate on the upper side portion of the shoveling plate, thereby avoiding material clamping between the directional sway and reset tooth point and the baffle plate on the upper side portion of the shoveling plate and further avoiding damping the running of the driving mechanism and faults such as damage of the driving mechanism and the like.

5. The cambered retainer ring is arranged on the rolling harrow supporter; the tooth point sway limiting pin rotates along with the corresponding directional sway and reset tooth point; when the directional sway and reset harrow teeth rotate into the material clamping interval between the directional sway and reset tooth points and the rolling harrow supporter, the tooth point sway limiting pins leave the cambered retainer ring, the directional sway and reset tooth points sway in the direction away from the rolling harrow supporter and the clamped materials fall off; and when the directional sway and reset barrow teeth rotate and leave the material clamping interval between the directional sway and reset tooth points and the rolling harrow supporter, the tooth point sway limiting pins rotate into the cambered retainer ring to prevent the directional sway and reset tooth points from swaying in the direction away from the rolling harrow supporter, and the cambered retainer ring controls the harrowing direction of the directional sway and reset tooth points such that the directional sway and reset tooth points keep the rigid state while harrowing materials downwards.

6. The roller or tooth point sway limiting pin shaft sleeve or bearing and the like are arranged on the tooth point sway limiting pin; and when the tooth point sway limiting pin rotates into the cambered retainer ring, the roller or tooth point sway limiting pin shaft sleeve or bearing and the like roll in the frictional motion manner along the cambered retainer ring; as a result, the abrasion of the tooth point sway limiting pin is reduced and the resistance to motions of the tooth point sway limiting pin in the cambered retainer ring is reduced.

7. The rolling harrow supporter is hinged to the body by using the supporter hinge shaft, when the directional sway and reset harrow teeth harrow relatively large materials and hardly harrow the materials into the feeder mechanism, the directional sway and reset harrow teeth are lifted up by the materials and the rolling harrow supporter is lifted up by the directional sway and reset harrow teeth, and then the rolling harrow supporter rotates around the supporter hinge shaft to prevent the large materials from damaging the directional sway and reset harrow teeth, the driving mechanism and the like.

8. The length of the directional sway and reset harrow teeth is greater than or equal to the diameter of the rolling harrow rotary piece, such that a harrowing quantity is increased and the harrowing efficiency is improved.

9. The reciprocating impact power piece is arranged in the reciprocating impact box body and connected with the driving mechanism outside the reciprocating impact box body; the reciprocating impact head is arranged on one end of the reciprocating impact guiding piece or the reciprocating impact heads are arranged on two ends of the reciprocating impact guiding piece; the reciprocating impact power piece drives the reciprocating impact guiding piece that drives the reciprocating impact head(s) to impact falling materials in the reciprocating manner; the reciprocating impact box body supports the rolling harrow rotary piece to rotate; one or two ends of the rolling harrow rotary piece are arranged outside the reciprocating impact box body; the directional sway and reset harrow teeth are arranged on the rolling harrow rotary piece outside the reciprocating impact box body; or the directional sway and reset harrow teeth are arranged on the rolling harrow rotary piece on the reciprocating impact box body, such that the reciprocating impact power box of the reciprocating impact excavator has such functions as harrowing and loading.

10. The rolling harrow driver is arranged on the falling and harrowing crank; the rolling harrow driver is arranged on the falling and harrowing crank within the reciprocating impact box body or on the end portion of the falling and harrowing crank outside the reciprocating impact box body; the rolling harrow driver drives the rolling harrow rotary piece to rotate and the rolling harrow rotary piece drives the directional sway and reset tooth points to rotate for harrowing materials; when materials are clamped between the reciprocating impact box body and one directional sway and reset tooth point, the directional sway and reset tooth point continues to rotate, and the rotating force drives the directional sway and reset tooth point that drives the movable end of the corresponding torsion spring to move, such that the movable end of the torsion spring sways in a direction away from the reciprocating impact box body; when the directional sway and reset tooth point sways and leaves a material clamping position between the directional sway and reset tooth point and the reciprocating impact box body, the movable end of the torsion spring restores and resets the directional sway and reset tooth point, and the directional sway and reset tooth point continues to rotate for harrowing materials; the connecting link is driven by using the rotating force of the falling and harrowing crank, such that the connecting link drives the impact head on the impact guiding piece to impact falling materials in the reciprocating manner, further, each directional sway and reset tooth point is driven by the rotating force of the crank to harrow materials; no harrowing driving piece is required, and therefore, the components of the reciprocating impact power box are reduced, and the functions, use value and the like of the crank are increased; in addition, the rolling harrow rotary piece and the reciprocating impact power piece share one driving mechanism, and therefore, the volume of the reciprocating impact excavator is reduced relatively while the harrowing function is added thereto, and the manufacturing cost is decreased, while the working efficiency and the applicability are improved.

11. The harrow tooth directional-rotating clutch is arranged between the falling and harrowing crank and the rolling harrow driver, or between the rolling harrow rotary piece and the directional sway and reset harrow teeth, or between the rolling harrow rotary piece and the rolling harrow driver or on the rolling harrow driver; when the falling and harrowing crank rotates in a direction to drive the directional sway and reset harrow teeth to harrow materials, the harrow tooth directional-rotating clutch transfers power to the directional sway and reset harrow teeth such that the directional sway and reset harrow teeth rotate to harrow materials; and when the rotating direction of the falling and harrowing crank is opposite to the harrowing direction of the directional sway and reset harrow teeth, the harrow tooth directional-rotating clutch stops transferring power to the directional sway and reset harrow teeth such that the directional sway and reset harrow teeth are in the state of rest; by means of cooperation of the positive and negative going motion of the falling and harrowing crank with the harrow tooth directional-rotating clutch, the crank, while rotating clockwise, impacts falling materials quickly in the reciprocating manner, and harrows and loads materials when rotating slowly and counterclockwise, and the directional sway and reset harrow teeth are stopped from rotating when the excavator impacts falling materials in the reciprocating manner; and therefore, the directional sway and reset harrow teeth are prevented from interfering with reciprocating impact on falling materials and the like.

12. The support claw supporting shaft and the support claw limiting piece are arranged on the reciprocating impact box body of the impact power box; the harrow tooth support claw is hinged to the support claw supporting shaft; the support claw limiting piece limits the rotating harrow tooth support claw, when the directional sway and reset harrow teeth rotate and harrow materials, the directional sway and reset harrow teeth smoothly rotate and harrow materials through the harrow tooth support claw after the harrow tooth support claw is lifted up a certain angle by the directional sway and reset harrow teeth, and when the directional sway and reset harrow teeth move in a direction opposite to the rotating and harrowing direction, the harrow tooth support claw is limited by the support claw limiting piece to lift up the directional sway and reset harrow teeth, and the directional sway and reset harrow teeth are in the state of rest; and the harrow tooth support claw enables the directional sway and reset harrow teeth in the state of rest to lean against the reciprocating impact power box body in the direction of the body.

13. The support claw falling limiting piece, the support claw upturning limiting piece and the like are arranged on the reciprocating impact box body; the support claw falling limiting piece prevents the harrow tooth support claw from falling off, while the support claw upturning limiting piece prevents the harrow tooth support claw from rotating to a position where the support claw falling limiting piece is unable to lift up the rolling harrow support claw, thereby ensuring that the harrow tooth support claw is always in an effective working state.

14. The directional sway and reset harrow teeth are high in structural strength, large in sway amplitude and reliable in performance, such that the reciprocating impact power box body, the directional sway and reset tooth points, the driving mechanism, the harrowing driver and the like are effectively protected from damage.

15. The reciprocating impact box body supports the guiding supporting wheel; the guiding supporting wheel supports the reciprocating impact guiding piece; the reciprocating impact driving piece drives the reciprocating impact power transmission piece that drives the crank, and the crank drives the connecting link that drives the reciprocating impact guiding piece to reciprocate; the reciprocating impact guiding piece extends out of the reciprocating impact box body and drives the reciprocating impact head to impact falling materials in the reciprocating manner; the reciprocating impact box body supports the reciprocating impact power transmission piece and the crank; the rolling harrow rotary piece is arranged on the lower portion of the side surface of the reciprocating impact box body; the reciprocating impact transmission harrowing power piece is arranged on the reciprocating impact power transmission piece; the harrow tooth directional-rotating clutch is arranged between the reciprocating impact power transmission piece and the reciprocating impact transmission harrowing power piece; the harrowing driving piece drives the reciprocating impact transmission harrowing power piece that drives the rolling harrow rotary piece to rotate, such that the directional sway and reset harrow teeth rotate and extend out of the surface of the reciprocating impact box body to harrow and transport materials impacted off by the reciprocating impact head to the feeder mechanism; the rolling harrow loader-excavator with the directional sway and reset harrow teeth does not require the harrowing driving piece, such that the components arranged on the reciprocating impact box body are reduced; the reciprocating impact transmission harrowing power piece is arranged on the reciprocating impact power transmission piece on the back of the crank, such that the distance between the reciprocating impact transmission harrowing power piece and the rolling harrow rotary piece is greater than the distance between the crank and the rolling harrow rotary piece, and therefore, the arrangement space of the directional sway and reset harrow teeth is increased, the length of the directional sway and reset harrow teeth can be increased, and the harrowing range and the harrowing quantity can be increased.

16. Compared with such a material clearing structure of a drum type excavator that materials are conveyed to a shoveling plate of the drum type excavator through spirally arranged rotary teeth, the directional sway and reset harrow teeth can be made into such forms as a claw type harrower, a plate type harrower, a toothed harrower or a shovel type harrower and the like; the directional sway and reset harrow teeth are longer than the rotary teeth of the drum type excavator, and materials harrowed by the directional sway and reset harrow teeth do not need to be discharged through a spiral channel; hence, when materials are harrowed, crushing large materials is avoided; the directional sway and reset harrow teeth can be selected according to using working conditions and properties of materials, such that the directional sway and reset harrow teeth can have better practical values, such as low dust in harrowing materials by using the directional sway and reset harrow teeth, high loading efficiency, high lump material rate of materials and high economic value of materials.

Figure 1:
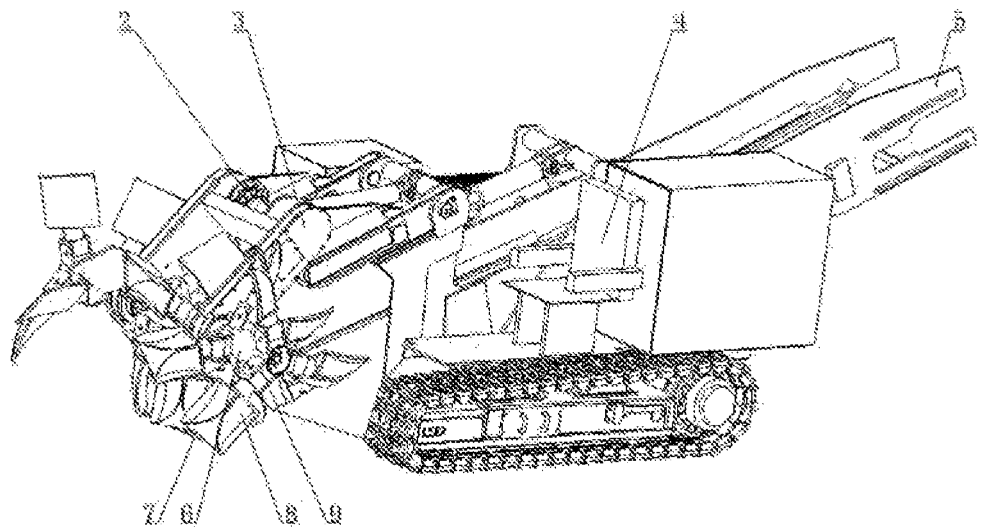
FIG. 1 is a front view of a rolling harrow loader-evacuator with directional sway and reset harrow teeth in embodiment 1.

In the FIG. 1, torsion spring tooth handle shaft retaining piece, 2, driving mechanism; 3, rolling harrow supporter; 4, body; 5, feeder mechanism; 6, rolling harrow rotary piece; 7, directional sway and reset harrow tooth; 8, directional sway and reset tooth point; 9, torsion spring shaft supporting piece; 10, tooth point sway limiting piece; 11, torsion spring tooth handle shaft; 12, tooth handle sway limiting piece; 13, torsion spring; 14, directional sway and reset tooth handle; 15, tooth handle rotary hole piece; 16, fixed end of torsion spring; 17, torsion spring positioning sleeve; 18, torsion spring pretension force adjusting block; 19, torsion spring pretension force adjusting thread; 20, torsion sprang pretension force adjusting screw, 21, baffle plate on upper side portion of shoveling plate; 22, shoveling plate; 23, cambered retainer ring; 24, tooth point sway limiting pin; 25, tooth point sway limiting pin shaft sleeve; 26, supporter hinge shaft; 27, reciprocating impact head; 28, impact power box; reciprocating impacting rolling harrow loading and transporting supporter; 30, reciprocating impact box body; 31, reciprocating impact power piece; 32, reciprocating impact guiding piece; 33, rolling harrow driver; 34, crank connecting link power piece; 35, failing and harrowing crank; 36, gear driver; 37, chain wheel driver; 38, harrow tooth directional-rotating clutch; 39, harrow tooth holder; 40, harrow tooth support claw; 41, support claw supporting shaft; 42, support claw limiting piece; 43, support claw falling limiting piece; 44, support claw upturning limiting piece; 45, movable end of torsion spring; 46, reciprocating impact driving piece; 47, crank; 48, connecting link; 49, guiding supporting wheel; 50, reciprocating impact power transmission piece; 51, harrowing driving piece; and 52, reciprocating impact transmission harrowing power piece.

DETAILED DESCRIPTION OF THE EMBODIMENTS

The present invention will be further described below in combination with accompanying drawings.

Embodiment 1

Figure 2:
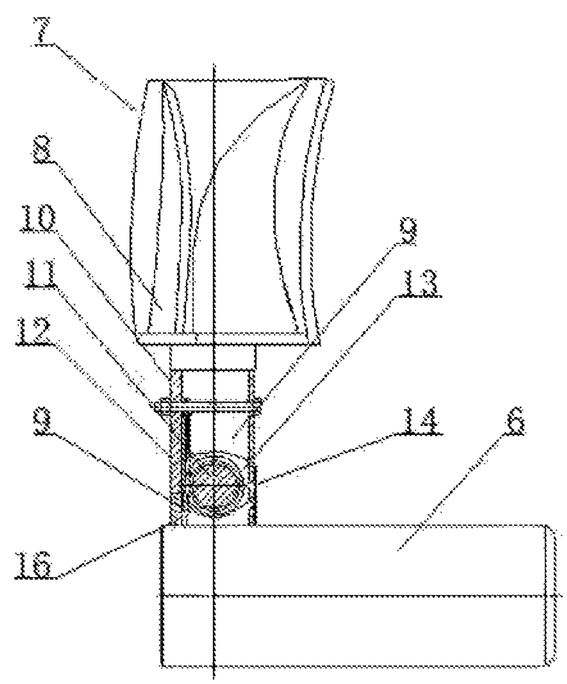
FIG. 2 is a structural schematic diagram of a directional sway and reset harrow tooth in embodiment 1.
Figure 3:
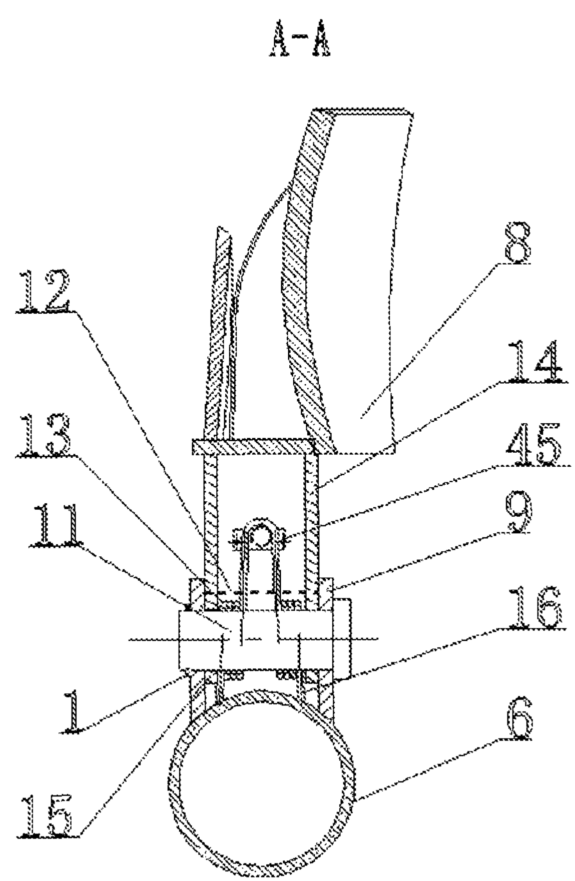
FIG. 3 is an A-A sectional view in FIG. 2.

FIGS. 1-3 show a rolling harrow loader-evacuator with directional sway and reset harrow teeth in embodiment 1. The rolling harrow loader-excavator with the directional sway and reset harrow teeth comprises a harrow rotary piece 6, directional sway and reset harrow teeth 7, a harrow supporter 3, a driving mechanism 2, a feeder mechanism 5, a body 4 and the like; each directional sway and reset harrow tooth 7 comprises a torsion spring shaft supporting piece 9, a tooth handle sway limiting piece 12, a directional sway and reset tooth handle 14, a directional sway and reset tooth point 8, a torsion spring tooth handle shaft 11, a torsion spring 13, a torsion spring tooth handle shaft retaining piece 1 and the like, wherein the directional sway and reset tooth handle 14 and the like are arranged on a lower portion of the directional sway and reset tooth point 8; the torsion spring shaft supporting piece 9 and the like are arranged on the rolling harrow rotary piece 6; the tooth handle sway limiting piece 12 and the like are arranged on the torsion spring shaft supporting piece 9 close to a position of the rolling harrow supporter 3; a tooth handle rotary hole piece 15 and the like are arranged on the directional sway and reset tooth handle 14; the torsion spring 13 and the like are arranged in the torsion spring shaft supporting piece 9; the torsion spring 13, the tooth handle rotary hole piece 15 and the like are connected, by using the torsion spring tooth handle shaft 11, to the torsion spring shaft supporting piece 9 in a penetrating manner; the torsion spring tooth handle shaft 11 is positioned on the torsion spring shaft supporting piece 9 by using the torsion spring tooth handle shaft retaining piece 1; a fixed end 16 of the torsion spring is arranged on the tooth handle sway limiting piece 12 or the torsion spring shaft supporting piece 9, while a movable end 45 of the torsion spring is arranged on the directional sway and reset tooth handle 14; a tooth point sway limiting piece 10 and the like are arranged on one side of the directional sway and reset tooth handle 14; and the tooth handle sway limiting piece 12 and the tooth point sway limiting piece 10 limit each other to prevent the directional sway and reset tooth point 8 and the like from swaying towards a space other than a limiting position of the provided tooth handle sway limiting piece 12; the rolling harrow rotary piece 6 is hinged to the rolling harrow supporter 3; the rolling harrow supporter 3 and the like are arranged on the body 4; the feeder mechanism 5 is arranged on the body 4; the driving mechanism 2 drives the rolling harrow rotary piece 6 and the like to rotate; when materials are clamped between the rolling harrow supporter 3 and the directional sway and reset harrow teeth 7, the directional sway and reset harrow teeth 7 and the like continue to rotate, and a rotating force drives each tooth handle rotary hole piece 15 and the like to rotate about the corresponding torsion spring tooth handle shaft 11 and simultaneously drives the movable end 45 of the corresponding torsion spring and the like to move, so that the corresponding directional sway and reset tooth point 8 and the like rotate in a direction away from the harrow supporter 3, and the clamped materials fall off; and when the directional sway and reset harrow teeth 7 and the like rotate and leave a material clamping position between the directional sway and reset harrow teeth 7 and the harrow supporter 3, the movable end 45 of the torsion spring restores and resets the directional sway and reset tooth point 8, and then the directional sway acid reset harrow teeth 7 and the like continue to rotate for harrowing materials.

The invention further includes a method for directionally swaying and resetting harrow teeth of a rolling harrow loader-excavator as follows. The method is implemented through the following steps:

A first method:

step 1: arranging a torsion spring shaft supporting piece and the like on a rolling harrow rotary piece and arranging a tooth handle sway limiting piece and the like on the torsion spring shaft supporting piece next to a position of a rolling harrow supporter;

step 2: arranging a directional sway and reset tooth handle and the like on a lower portion of a directional sway and reset tooth point;

step 3: arranging a tooth handle rotary hole piece and the like on the directional sway and reset tooth handle, connecting a torsion spring, the tooth handle rotary hole piece and the like to the torsion spring shaft supporting piece in a penetrating manner by using a torsion spring tooth handle shaft, limiting the torsion spring tooth handle shaft and the like on the torsion spring shaft supporting piece by using a torsion spring tooth handle shaft retaining piece, arranging a fixed end of the torsion spring on the tooth handle sway limiting piece or the torsion spring shaft supporting piece or the like, and arranging a movable end of the torsional spring on the directional sway and reset tooth handle;

step 4: arranging a tooth point sway limiting piece for mutually limiting the tooth handle sway limiting piece and the like on the directional sway and reset tooth handle, wherein the tooth handle sway limiting piece and the tooth point sway limiting piece and the like limit each other to prevent the directional sway and reset tooth point from swaying towards a space other than a limiting position of the tooth handle sway limiting piece; and step 5: hinging the rolling harrow rotary piece to the rolling harrow supporter, arranging the rolling harrow supporter and the like on a body, arranging a feeder mechanism and the like on the body, and enabling a driving mechanism to drive the rolling harrow rotary piece and the like to rotate, wherein when materials are clamped between the rolling harrow supporter and the directional sway and reset harrow teeth, the directional sway and reset harrow teeth and the like continue to rotate, and a rotating force drives each tooth handle rotary hole piece and the like to rotate about the corresponding torsion spring tooth handle shaft and simultaneously drives the movable end of the corresponding torsion spring to move, so that the corresponding directional sway and reset tooth point and the like rotate in a direction away from the harrow supporter, and the clamped materials fall off; the directional sway and reset harrow teeth continue to rotate, and when the directional sway and reset harrow teeth rotate and leave a material clamping position between the directional sway and reset harrow teeth and the harrow supporter, the movable end of each torsion spring restores and resets each directional sway and reset tooth point for continuously harrowing materials.

Embodiment 2

Figure 4:
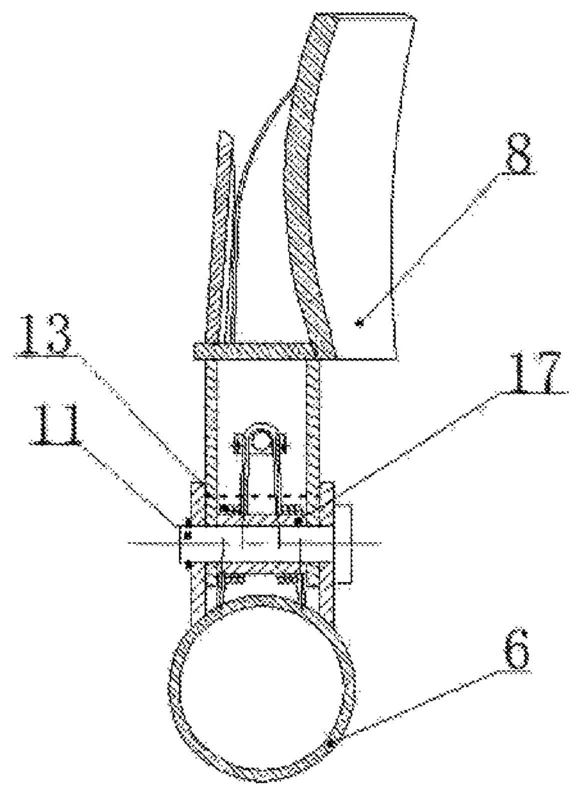
FIG. 4 is a structural schematic diagram of a directional sway and reset harrow tooth in embodiment 2.

As shown in FIG. 4, illustrated is the rolling harrow loader-evacuator with the directional sway and reset harrow teeth in embodiment 2. Difference from embodiment 1: a torsion spring positioning sleeve 17 and the like are arranged between the torsion spring tooth handle shaft 11 and the torsion spring 13, and the torsion spring 13 is arranged on the torsion spring positioning sleeve 17.

The others are the same as embodiment 1.

Embodiment 3

Figure 5:
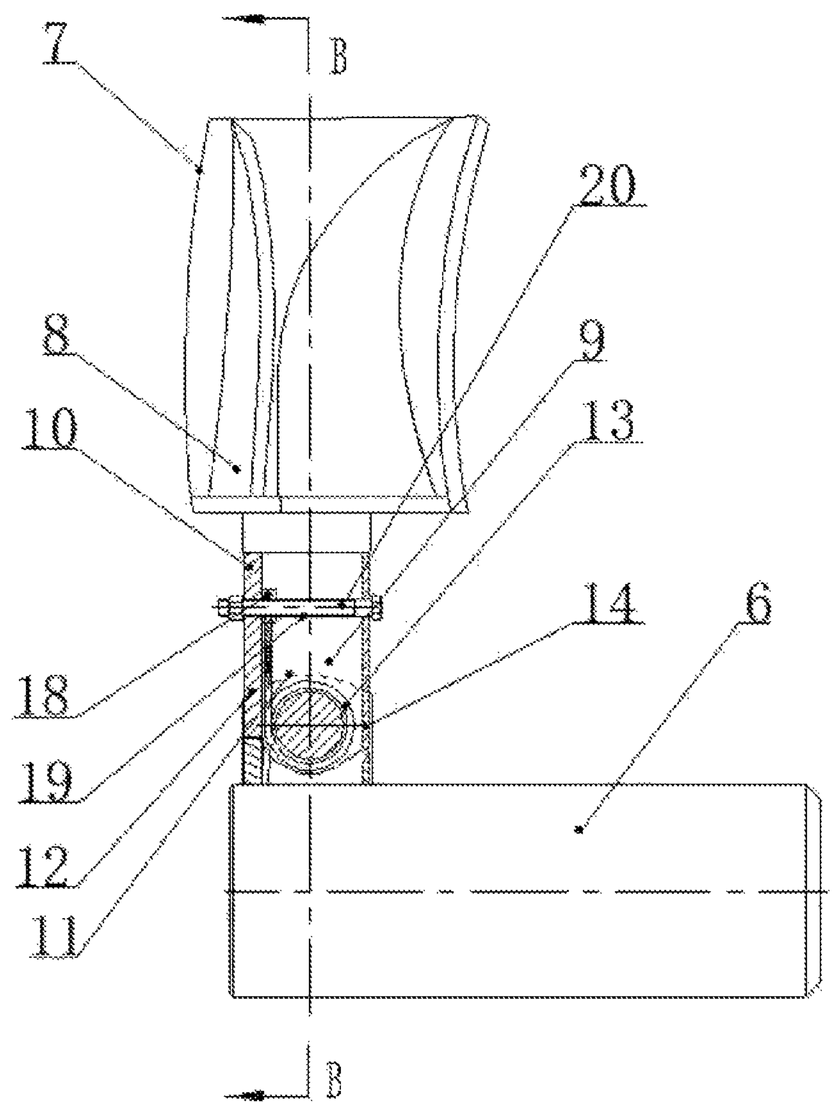
FIG. 5 is a structural schematic diagram of a directional sway and reset harrow tooth in embodiment 3.
Figure 6:
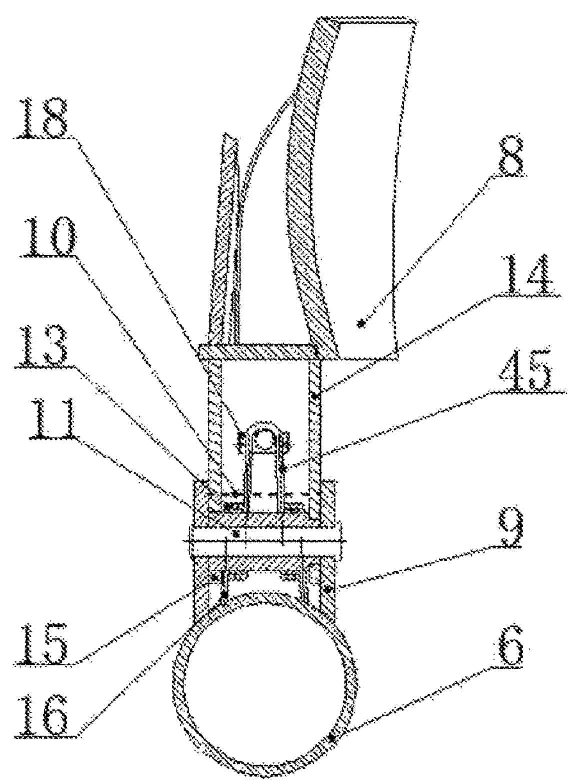
FIG. 6 is a B-B sectional view in FIG. 5.

As shown in FIGS. 5 and 6, illustrated is the rolling harrow loader-evacuator with the directional sway and reset harrow teeth as shown in embodiment 3. Difference from embodiment 1 the directional sway and reset tooth handle 14 comprises a torsion spring pretension force adjusting block 18, torsion spring pretension force adjusting threads 19, a torsion spring pretension force adjusting screw 20 and the like; the torsion spring pretension force adjusting screw 20 penetrates through the torsion spring pretension force adjusting threads 19, the torsion spring pretension force adjusting block 18 and the like; the torsion spring pretension force adjusting block 18 is closely affixed to the movable end 45 or the fixed end 16 of the torsion spring or the like; the torsion spring pretension force adjusting screw 20 is rotated to enable the torsion spring pretension force adjusting block 18 to move along the torsion spring pretension force adjusting screw 20, such that an elastic force of the movable end 45 of the torsion spring is suitable for swaying and resetting the directional sway and reset tooth point 8 towards one side.

The others are the same as embodiment 1.

Embodiment 4

Figure 7:
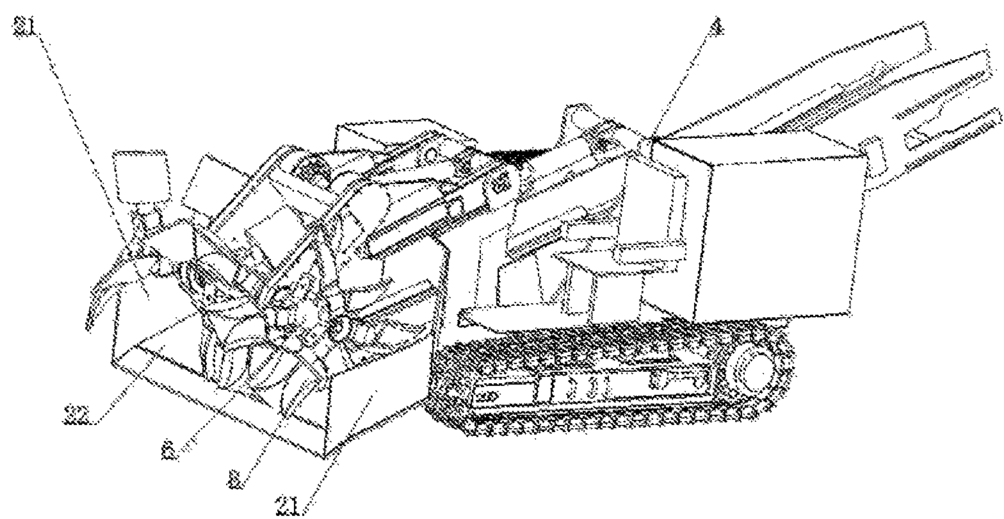
FIG. 7 is a front view of a rolling harrow loader-evacuator with directional sway and reset harrow teeth in embodiment 4.

As shown in FIG. 7, illustrated is the rolling harrow loader-evacuator with the directional sway and reset harrow teeth as shown in embodiment 4. Difference from embodiment 1: the body 4 comprises a shoveling plate 22 and the like; the shoveling plate 22 comprises a baffle plate 21 on an upper side portion of the shoveling plate and the like; a sway plane of each directional sway and reset tooth point 8 is arranged relatively perpendicular to the baffle plate 21 on the upper side portion of the shoveling plate; and when materials are clamped between the baffle plate 21 on the upper side portion of the shoveling plate and the directional sway and reset harrow teeth 7, each directional sway and reset tooth point 8 sways in a direction away from the baffle plate 21 on the upper side portion of the shoveling plate.

The others are the same as embodiment 1.

Embodiment 5

Figure 8:
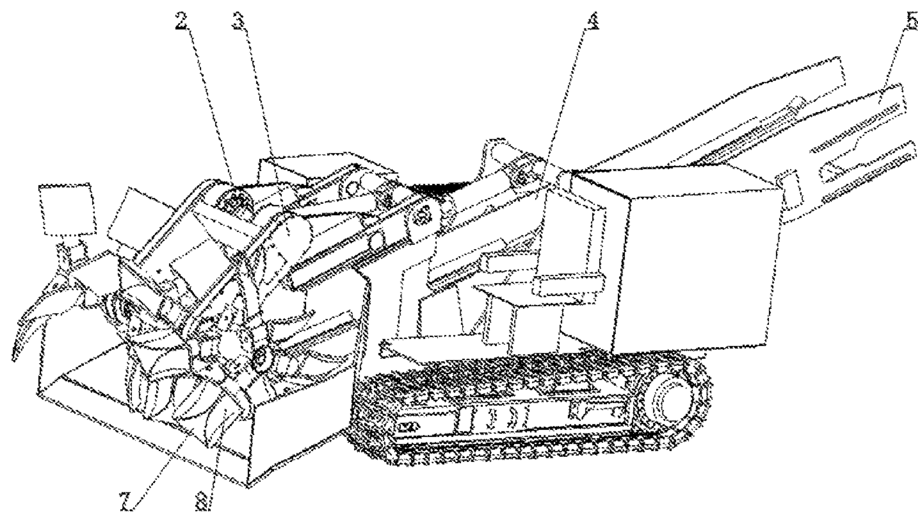
FIG. 8 is a structural schematic diagram of a rolling harrow loader-evacuator with directional sway and reset harrow teeth in embodiment 5.
Figure 9:
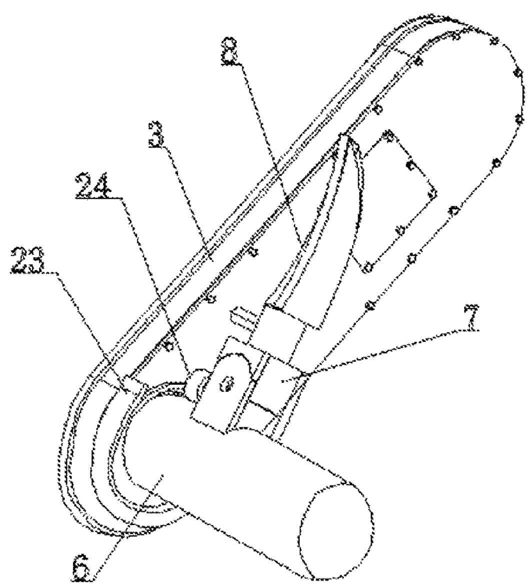
FIG. 9 is a structural schematic diagram of arrangement of a directional sway and reset harrow tooth in embodiment 5.
Figure 10:
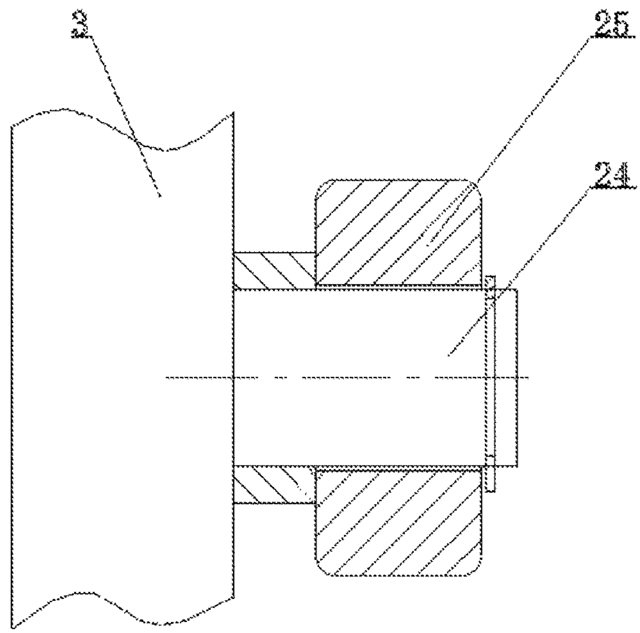
FIG. 10 is a structural schematic diagram of arrangement of a tooth point sway limiting pin shaft sleeve in embodiment 5.

As shown in FIGS. 8-10, illustrated is the rolling harrow loader-evacuator with the directional sway and reset harrow teeth as shown in embodiment 5. Difference from embodiment 1: a cambered retainer ring 23 and the like are arranged on the rolling harrow supporter 3; a tooth point sway limiting pin 24 and the like are arranged on each directional sway and reset tooth point 8 and rotate along with the directional sway and reset tooth point 8; when the directional sway and reset harrow teeth 7 rotate into a material clamping interval between the directional sway and reset tooth points 8 and the rolling harrow supporter 3, the tooth point sway limiting pins 24 and the like leave the cambered retainer ring 23, the directional sway and reset tooth points 8 sway in a direction away from the rolling harrow supporter 3 and the clamped materials fall off; and when the directional sway and reset harrow teeth 7 rotate and leave the material clamping interval between the directional sway and reset tooth points 8 and the rolling harrow supporter 3, the tooth point sway limiting pins 24 rotate into the cambered retainer ring 23 to prevent the directional sway and reset tooth points 8 from swaying in the direction away from the rolling harrow supporter 3, and the cambered retainer ring 23 and the like controls a harrowing direction of the directional sway and reset tooth points 8 such that the directional sway and reset tooth points 8 keep a rigid state while harrowing materials downwards.

As shown in FIGS. 9 and 10, a tooth point sway limiting pin shaft sleeve 25 and the like are arranged on each tooth point sway limiting pin 24; and when the tooth point sway limiting pin 24 rotates into the cambered retainer ring 23, the tooth point sway limiting pin shaft sleeve 25 rolls in a frictional motion manner along the cambered retainer ring 23. The tooth point sway limiting pin shaft sleeve 25 also can be replaced by a roller, a bearing or the like.

The others are the same as embodiment 1.

Embodiment 6

Figure 11:
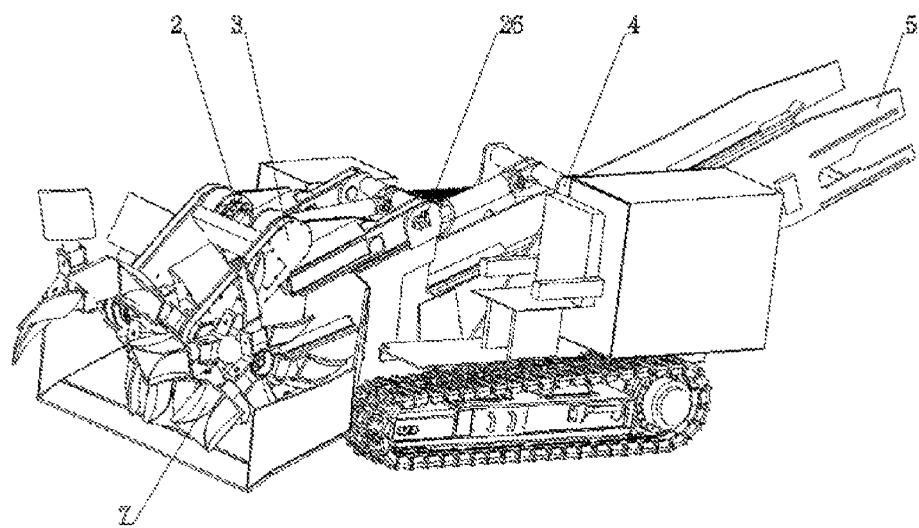
FIG. 11 is a structural schematic diagram of a rolling harrow loader-evacuator with directional sway and reset harrow teeth in embodiment 6.
Figure 12:
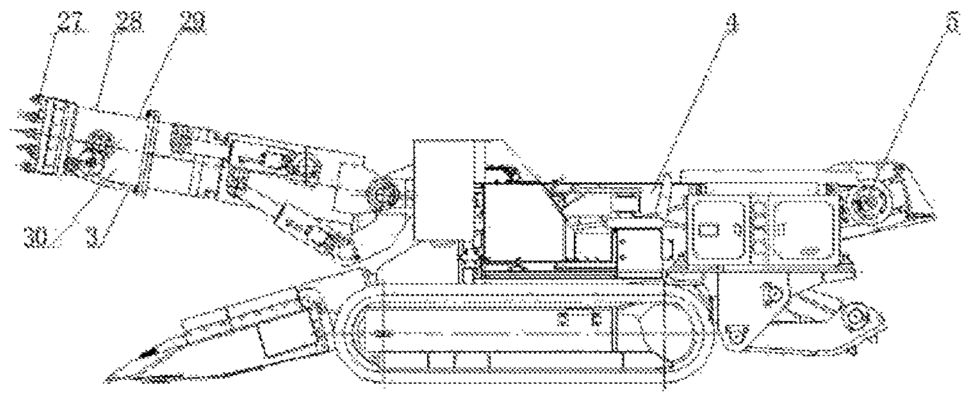
FIG. 12 is a structural schematic diagram of a rolling harrow loader-evacuator with directional sway and reset harrow teeth in embodiment 7.
Figure 13:
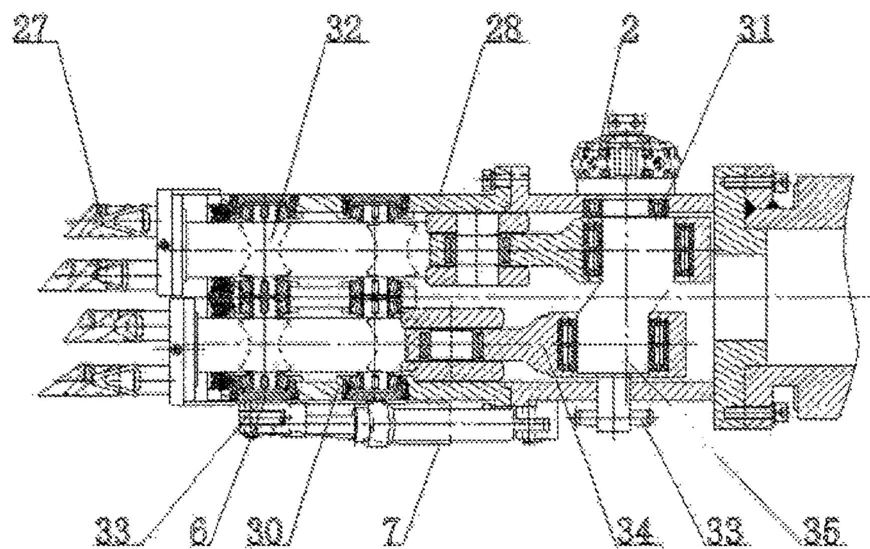
FIG. 13 is a structural schematic diagram of an impact power box in embodiment 7.
Figure 14:
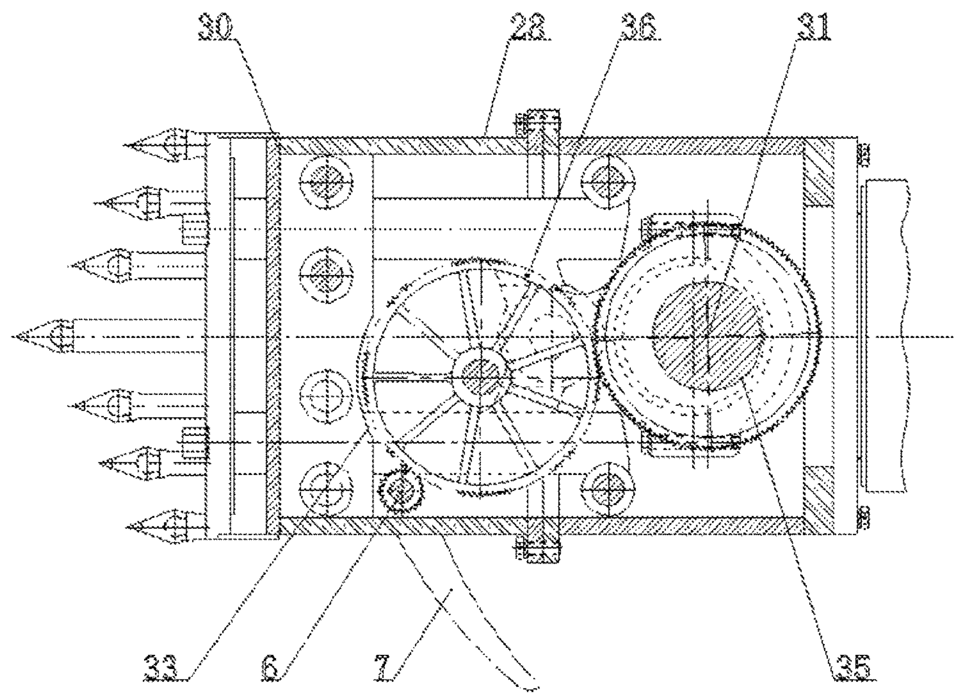
FIG. 14 is a structural schematic diagram of arrangement of a gear driver in embodiment 7.
Figure 15:
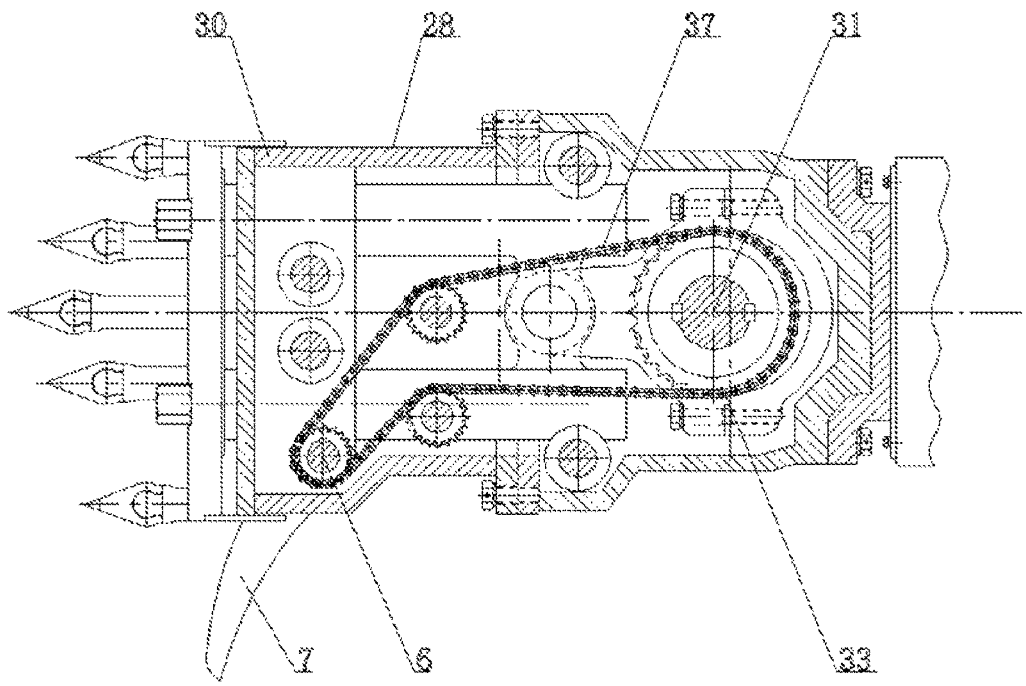
FIG. 15 is a structural schematic diagram of arrangement of a chain wheel driver in embodiment 7.

As shown in FIG. 11, illustrated is the rolling harrow loader-evacuator with the directional sway and reset harrow teeth as shown in embodiment 6. Difference from embodiment 1: the rolling harrow supporter 3 is hinged to the body 4 by using a supporter hinge shaft 26; when the directional sway and reset harrow teeth 7 harrow relatively large materials and hardly harrow the materials into the feeder mechanism 5, the directional sway and reset harrow teeth 7 and the like are lifted up by the materials and the rolling harrow supporter 3 and the like are lifted up by the directional sway and reset harrow teeth 7, and then the rolling harrow supporter 3 and the like rotate around the supporter hinge shaft 26 to prevent the large materials from damaging the directional sway and reset harrow teeth, the driving mechanism and the like.

The others are the same as embodiment 1.

Embodiment 7

As shown in FIGS. 12-15, illustrated is the rolling harrow loader-evacuator with the directional sway and reset harrow teeth as shown in embodiment 7. Difference from embodiment 1: the rolling harrow supporter 3 is a reciprocating impacting rolling harrow loading and transporting supporter 29 or the like; the reciprocating impacting rolling harrow loading and transporting supporter 29 comprises a reciprocating impact head 27, an impact power box 28 and the like; the impact power box 28 comprises a reciprocating impact box body 30, a reciprocating impact power piece 31, a reciprocating impact guiding piece 32 and the like; the reciprocating impact power piece 31 is arranged in the reciprocating impact box body 30 and connected with the driving mechanism 2; the reciprocating impact box body 30 supports the reciprocating impact power piece 31, the reciprocating impact guiding piece 32 and the like; the reciprocating impact head 27 is arranged on the reciprocating impact guiding piece 32 extending out of the reciprocating impact box body 30; the reciprocating impact power piece 31 drives the reciprocating impact guiding piece 32; the reciprocating impact guiding piece 32 drives the reciprocating impact head 27 to impact falling materials in a reciprocating manner; the rolling harrow rotary piece 6 is arranged on a lower portion of a side surface of the reciprocating impact box body; one or two ends of the rolling harrow rotary piece 6 are arranged outside the reciprocating impact box body 30; the directional sway and reset harrow teeth 7 are arranged on the rolling harrow rotary piece 6 outside the reciprocating impact box body 30; the rolling harrow rotary piece 6 drives the directional sway and reset harrow teeth 7 to rotate; the directional sway and reset harrow teeth 7 rotate and extend out of a surface of the reciprocating impact box 30 to harrow and transport materials impacted off by the reciprocating impact had 27 to the feeder mechanism 5; the reciprocating impact power piece 31 includes a crank connecting link power piece 34, a hydraulic power piece, a pneumatic power piece or the like.

The crank connecting link power piece 34 comprises a falling and harrowing crank 35 and the like; a rolling harrow driver 33 and the like are arranged on the falling and harrowing crank 35; the rolling harrow driver 33 is arranged on the falling and harrowing crank 35 within the reciprocating impact box body 30 or on an end portion of the falling and harrowing crank 35 outside the reciprocating impact box body 30 or the like; the rolling harrower driver 33 comprises a belt driver, a chain wheel driver, a gear driver or the like; the rolling harrow driver 33 drives the rolling harrow rotary piece 6 and the like to rotate and the rolling harrow rotary piece 6 drives the directional sway and reset tooth points 8 and the like to rotate for harrowing materials; when materials are clamped between the reciprocating impact box body 30 and one directional sway and reset tooth point 8, the directional sway and reset tooth point 8 and the like continue to rotate, and a rotating force drives the directional sway and reset tooth point 8 and the like, and the directional sway and reset tooth point 8 drives the movable end 45 of the corresponding torsion spring to move, such that the movable end 45 of the torsion spring sways in a direction away from the reciprocating impact box body 30 and the clamped materials fall off; when the directional sway and reset tooth point 8 sways and leaves a material clamping position between the directional sway and reset tooth point 8 and the reciprocating impact box body 30 and the like, the movable end 45 of the torsion spring restores and resets the directional sway and reset tooth point 8 and the like, and the directional sway and reset tooth point 8 and the like continue to rotate for harrowing materials.

The rolling harrow supporter also may be a rolling harrow loading-excavation supporter or the like.

The others are the same as embodiment 1.

Embodiment 8

Figure 16:
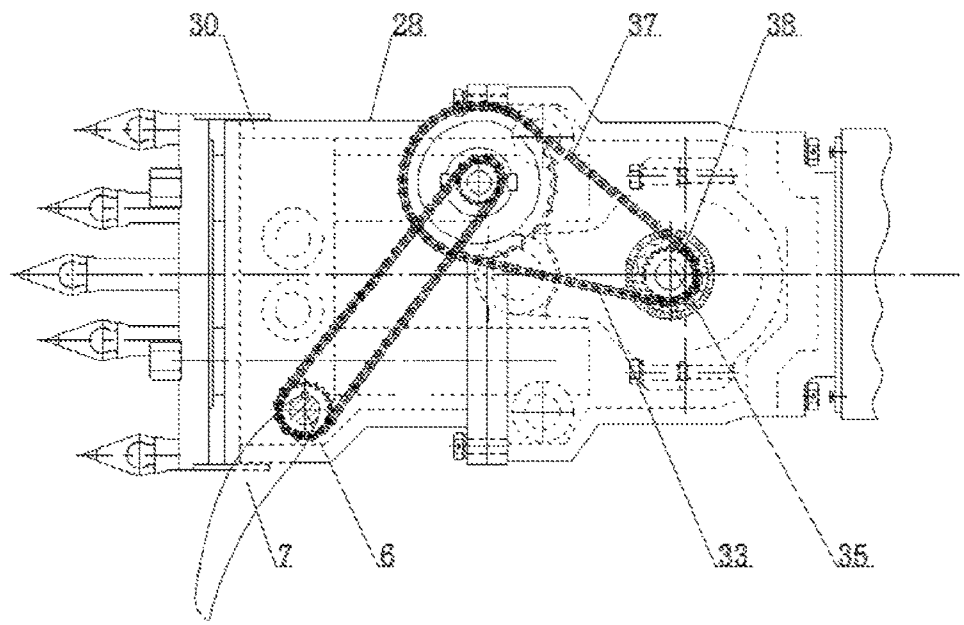
FIG. 16 is a structural schematic diagram of arrangement of a harrow tooth directional-rotating clutch between a falling and harrowing crank and a rolling harrow driver in embodiment 8.

As shown in FIGS. 16-19, illustrated is the rolling harrow loader-evacuator with the directional sway and reset harrow teeth as shown in embodiment 8. Difference from embodiment 1: as shown in FIG. 16, a harrow tooth directional-rotating clutch 38 and the like are arranged between the falling and harrowing crank 35 and the rolling harrow driver 33; when the falling and harrowing crank 35 rotates in a direction to drive the directional sway and reset harrow teeth 7 to harrow materials, the harrow tooth directional-rotating clutch 38 transfers power to the directional sway and reset harrow teeth 7 and the like such that the directional sway and reset harrow teeth 7 rotate to harrow materials; and when a rotating direction of the falling and harrowing crank 35 is opposite to a harrowing direction of the directional sway and reset harrow teeth 7, the harrow tooth directional-rotating clutch 38 stops transferring power to the directional sway and reset harrow teeth 7 such that the directional sway and reset harrow teeth 7 are in a state of rest.

Figure 17:
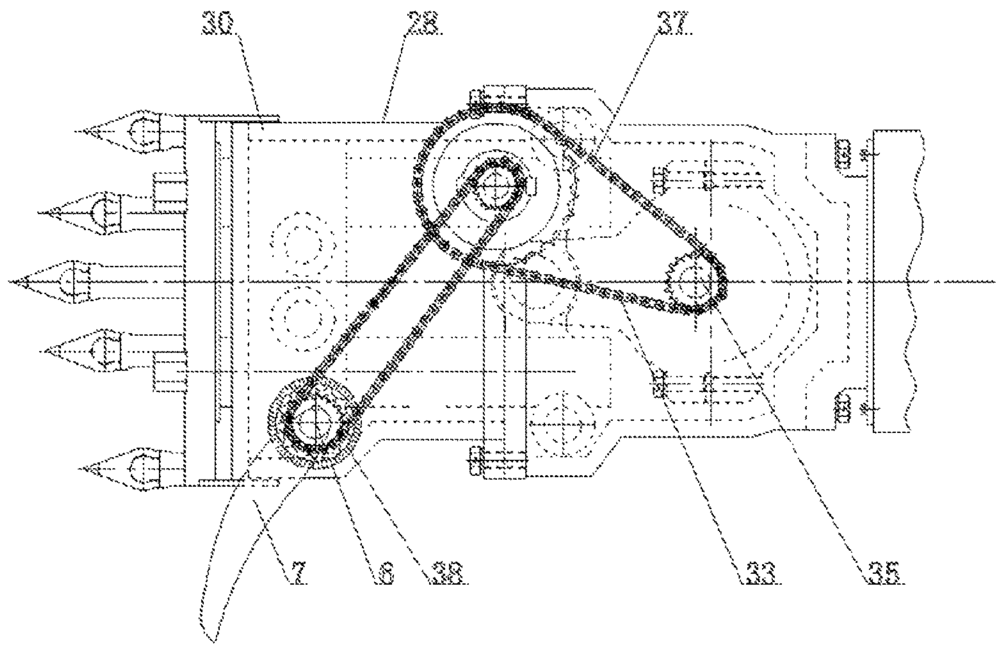
FIG. 17 is a structural schematic diagram of arrangement of a harrow tooth directional-rotating clutch between a rolling harrow rotary piece and directional sway and reset harrow teeth in embodiment 8.
Figure 18:
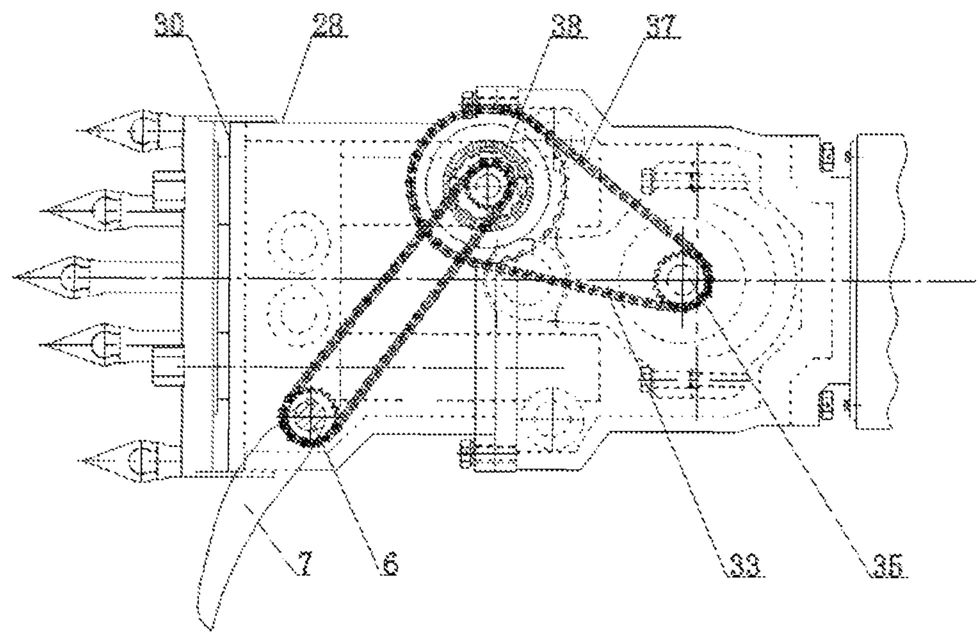
FIG. 18 is a structural schematic diagram of a harrow tooth directional-rotating clutch arranged on a rolling harrow driver in embodiment 8.
Figure 19:
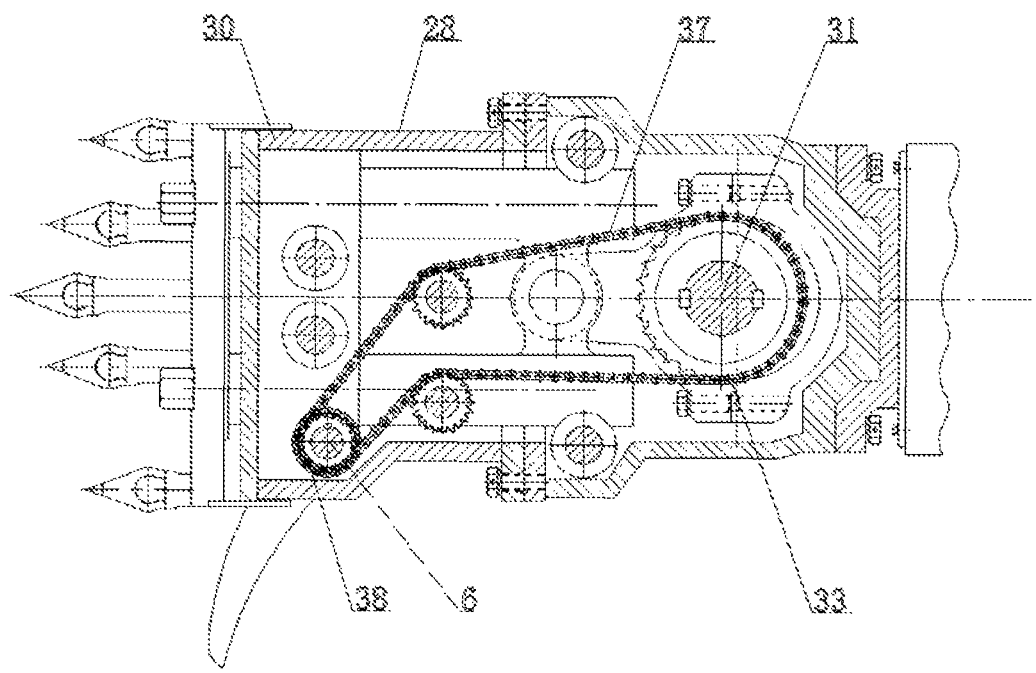
FIG. 19 is a structural schematic diagram of a harrow tooth directional-rotating clutch arranged between a hollow harrow rotary piece and a rolling harrow driver in embodiment 8.

Or, the harrow tooth directional-rotating clutch 38 is arranged between the rolling harrow rotary piece 6 and the directional sway and reset harrow teeth 7, as shown in FIG. 17; or, the harrow tooth directional-rotating clutch 38 is arranged between the rolling harrow rotary piece 6 and the rolling harrow driver 33, as shown in FIG. 19; or the harrow tooth directional-rotating clutch 38 is arranged on the rolling harrow driver 33 and the like, as shown in FIG. 18.

The harrow tooth directional-rotating clutch 38 includes a pawl-type one-way overrunning clutch, a one-way overrunning clutch with no poking claw, a one-way overrunning clutch with a poking claw, a two-way overrunning clutch with a poking claw, a wedge overrunning clutch, a jaw clutch, a rotating key clutch, a gear clutch, a disc friction clutch, a piston cylinder friction clutch, a diaphragm-type friction clutch, a pneumatic tyre type friction clutch, a piston cylinder rotary type friction clutch, a piston cylinder fixed type friction clutch, an electromagnetic jaw clutch, a single-disc electromagnetic friction clutch with no sliding ring, a multi-plate electromagnetic friction clutch with a sliding ring, a magnetic powder clutch, an electromagnetic slip clutch, a centrifugal clutch or the like. The others are the same as embodiment 1.

Embodiment 9

Figure 20:
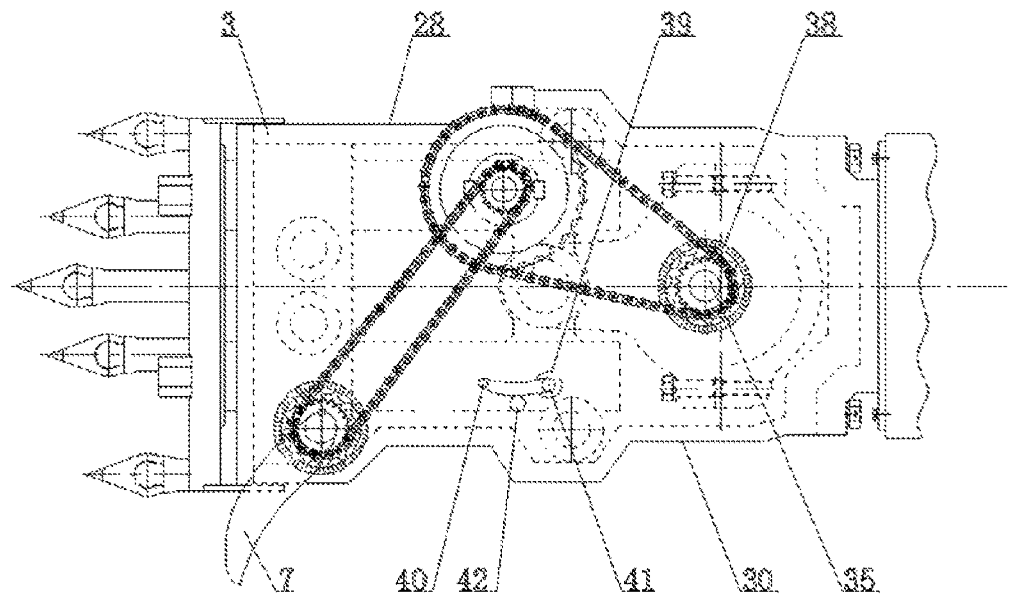
FIG. 20 is a structural schematic diagram of arrangement of a harrow tooth holder in embodiment 9.

As shown in FIG. 20, illustrated is the rolling harrow loader-evacuator with the directional sway and reset harrow teeth as shown in embodiment 9. Different from embodiment 1: a harrow tooth holder 39 and the like are arranged on the rolling harrower supporter 3; the harrow tooth holder 39 comprises a harrow tooth support claw 40, a support claw supporting shaft 41, a support claw limiting piece 42 and the like; the support claw supporting shaft 41, the support claw limiting piece 42 and the like are arranged on the reciprocating impact box body 30 of the impact power box 28; the harrow tooth support claw 40 is hinged to the support claw supporting shaft 41; the support claw limiting piece 42 limits the rotating harrow tooth support claw 40 and the like; when the directional sway and reset harrow teeth 7 and the like rotate and harrow materials, the directional sway and reset harrow teeth 7 smoothly rotate and harrow materials through the harrow tooth support claw 40 after the harrow tooth support claw 40 and the like are lifted up a certain angle by the directional sway and reset harrow teeth 7; and when the directional sway and reset harrow teeth 7 move in a direction opposite to a rotating and harrowing direction, the harrow tooth support claw 40 is limited by the support claw limiting piece 42 to lift up the directional sway and reset harrow teeth 7 and the like, and the directional sway and reset harrow teeth 7 are in the state of rest.

Embodiment 10

Figure 21:
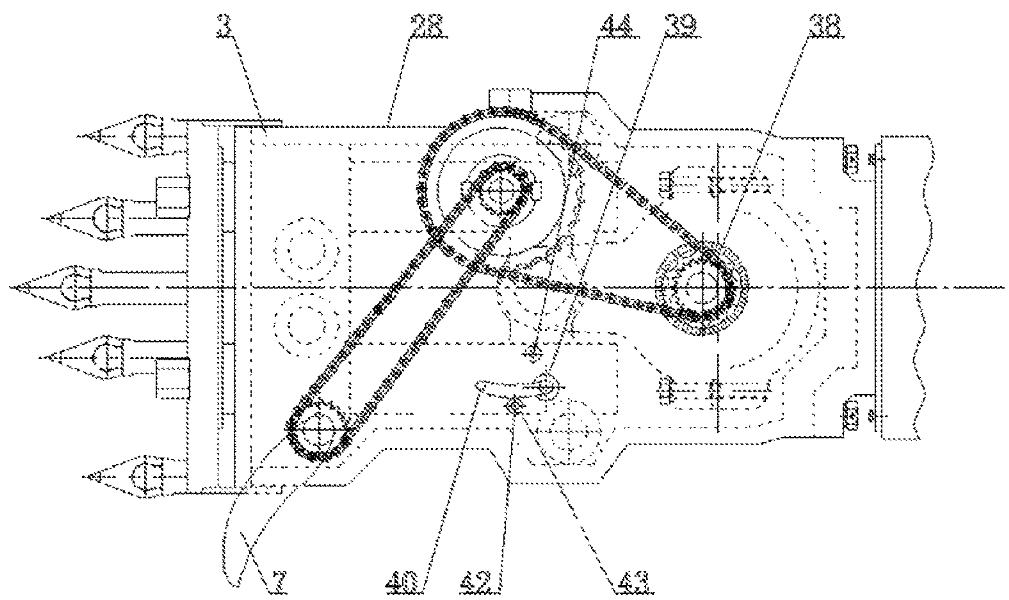
FIG. 21 is a structural schematic diagram of arrangement of a support claw limiting piece in embodiment 10.

As shown in FIG. 21, illustrated is the rolling harrow loader-evacuator with the directional sway and reset harrow teeth as shown in embodiment 10; the support claw limiting piece 42 comprises a support claw falling limiting piece 43, a support claw upturning limiting piece 44 and the like, which are arranged on the reciprocating impact box body 30; the support claw falling limiting piece 43 prevents the harrow tooth support claw 40 and the like from falling off, while the support claw upturning limiting piece 44 prevents the harrow tooth support claw 40 and the like from rotating to a position where the support claw falling limiting piece 43 is unable to lift up the rolling harrow support claw; the support claw falling limiting piece 43 and the support claw upturning limiting piece 44 are arranged separately or integrally.

In order to reduce abrasion of the harrow tooth support claw when the directional sway and reset harrow teeth rotate, the harrow tooth support claw and/or the directional sway and reset tooth points may be made of a quenched steel or a nodular cast iron, or be coated with a wear-resistant material layer on the surface; or, a wear-resistant shock-absorbing protective jacket is arranged on the support claw or the support claw is made of a wear-resistant shock-absorbing material.

The others are the same as embodiment 1.

Embodiment 11

Figure 22:
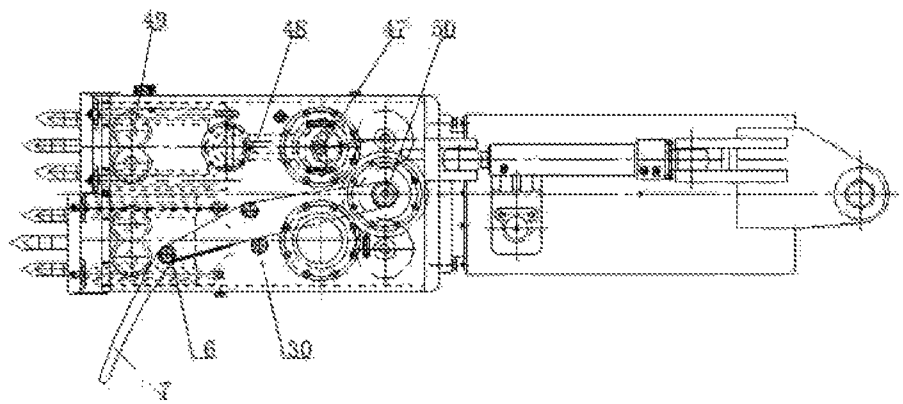
FIG. 22 is a structural schematic diagram of a rolling harrow loader-evacuator with directional sway and reset harrow teeth in embodiment 11.
Figure 23:
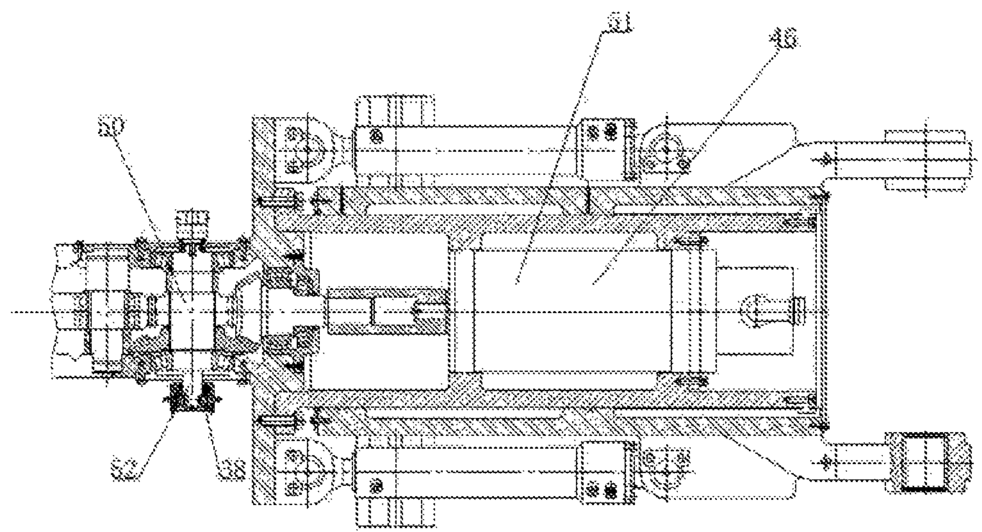
FIG. 23 is a structural schematic diagram of a rolling harrow loader-evacuator with directional sway and reset harrow teeth in embodiment 11.

As shown in FIGS. 22 and 23, illustrated is the rolling harrow loader-evacuator with the directional sway and reset harrow teeth as shown in embodiment 11. The driving mechanism 2 comprises a reciprocating impact driving piece 46 and the like; the rolling harrow supporter 3 includes a rolling harrow loading-excavation supporter, a reciprocating impacting rolling harrow loading and transporting supporter 29 or the like; the reciprocating impacting rolling harrow loading and transporting supporter 29 comprises a reciprocating impact head 27, an impact power box 28 and the like; the impact power box 28 comprises a reciprocating impact box body 30, a reciprocating impact power piece 31 and the like; the reciprocating impact power piece 31 comprises a crank 47, a connecting link 48, a reciprocating impact guiding piece 32, a guiding supporting wheel 49, a reciprocating impact power transmission piece 50 and the like; the reciprocating impact box body 30 supports the guiding supporting wheel 49 and the like; the guiding supporting wheel 49 supports the reciprocating impact guiding piece 32 and the like; the reciprocating impact driving piece 46 drives the reciprocating impact power transmission piece 50 and the like; the reciprocating impact power transmission piece 50 drives the crank 47, and the crank 47 drives the connecting link 48 that drives the reciprocating impact guiding piece 32 to reciprocate; the reciprocating impact guiding piece 32 extends out of the reciprocating impact box body 30 and drives the reciprocating impact head 27 to impact falling materials in a reciprocating manner, the reciprocating impact box body 30 supports the reciprocating impact power transmission piece 50 and the crank 47; the driving mechanism 2 further comprises a harrowing driving piece 51 and the like; the rolling harrow rotary piece 6 is arranged on a lower portion of a side surface of the reciprocating impact box body 30; a reciprocating impact transmission harrowing power piece 52 is arranged on the reciprocating impact power transmission piece 50; a harrow tooth directional-rotating clutch 38 is arranged between the reciprocating impact power transmission piece 50 and the reciprocating impact transmission harrowing power piece 52; the harrowing driving piece 51 drives the reciprocating impact transmission harrowing power piece 52 that drives the rolling harrow rotary piece 6 to rotate, such that the directional sway and reset harrow teeth 7 rotate and extend out of the surface of the reciprocating impact box body 30 to harrow and transport materials impacted off by the reciprocating impact head 27 to the feeder mechanism 5; the harrowing driving piece 51 is integrated with the reciprocating impact driving piece 46, and can be a motor driving piece, a hydraulic driving piece, a pneumatic driving piece or the like.

No harrowing driving piece is required by the rolling harrow loader-evacuator with the directional sway and reset harrow teeth, and therefore, the components arranged on the reciprocating impact power box 30 are reduced; the reciprocating impact transmission harrowing power piece 52 is arranged on the reciprocating impact power transmission piece 50 on the back of the crank 47, such that the distance between the reciprocating impact transmission harrowing power piece 52 and the rolling harrow rotary piece 6 is greater than the distance between the crank 47 and the rolling harrow rotary piece 6, and therefore, the arrangement space of the directional sway and reset harrow teeth 7 is increased, the length of the directional sway and reset harrow teeth 7 can be increased, and the harrowing range and the harrowing quantity can be increased.

The others are the same as embodiment 1.

The invention claimed is:

1. A method for directionally swaying and resetting harrow teeth of a rolling harrow loader-excavator, the method being implemented through the following steps:

step 1: arranging a torsion spring shaft supporting piece on a rolling harrow rotary piece and arranging a tooth handle sway limiting piece on the torsion spring shaft supporting piece next to a position of a rolling harrow supporter;

step 2: arranging a directional sway and reset tooth handle on a lower portion of a directional sway and reset tooth point;

step 3: arranging a tooth handle rotary hole piece on the directional sway and reset tooth handle, connecting a torsion spring and the tooth handle rotary hole piece to the torsion spring shaft supporting piece in a penetrating manner by using a torsion spring tooth handle shaft, limiting the torsion spring tooth handle shaft on the torsion spring shaft supporting piece by using a torsion spring tooth handle shaft retaining piece, arranging a fixed end of the torsion spring on the tooth handle sway limiting piece or the torsion spring shaft supporting piece, and arranging a movable end of the torsional spring on the directional sway and reset tooth handle;

step 4: arranging a tooth point sway limiting piece for mutually limiting the tooth handle sway limiting piece on the directional sway and reset tooth handle, wherein the tooth handle sway limiting piece and the tooth point sway limiting piece limit each other to prevent the directional sway and reset tooth point from swaying towards a space other than a limiting position of the tooth handle sway limiting piece; and step 5: hinging the rolling harrow rotary piece to the rolling harrow supporter, arranging the rolling harrow supporter on a body, arranging a feeder mechanism on the body, and enabling a driving mechanism to drive the rolling harrow rotary piece to rotate, wherein when materials are clamped between the rolling harrow supporter and the directional sway and reset harrow teeth, the directional sway and reset harrow teeth continue to rotate, and a rotating force drives each tooth handle rotary hole piece to rotate about the corresponding torsion spring tooth handle shaft and simultaneously drives the movable end of the corresponding torsion spring to move, so that the corresponding directional sway and reset tooth point rotates in a direction away from the harrow supporter, and the clamped materials fall off; the directional sway and reset harrow teeth continue to rotate, and when the directional sway and reset harrow teeth rotate and leave a material clamping position between the directional sway and reset harrow teeth and the harrow supporter, the movable end of each torsion spring restores and resets each directional sway and reset tooth point for continuously harrowing materials.

2. The method for directionally swaying and resetting the harrow teeth of the rolling harrow loader-excavator of claim 1, further comprising the following steps:

arranging a torsion spring pretension force adjusting block, forming torsion spring pretension force adjusting threads on each directional sway and reset tooth handle, enabling a torsion spring pretension force adjusting screw to penetrate through the torsion spring pretension force adjusting threads and the torsion spring pretension force adjusting block, closely affixing the torsion spring pretension force adjusting block to the movable end or the fixed end of the corresponding torsion spring, and rotating the torsion spring pretension force adjusting screw such that the torsion spring pretension force adjusting block moves along the torsion spring pretension force adjusting screw, leading to that an elastic force of the movable end of the torsion spring is suitable for swaying and resetting the corresponding directional sway and reset tooth point to one side.

3. A rolling harrow loader-excavator with directional sway and reset harrow teeth for implementing the method for directionally swaying and resetting the harrow teeth of the rolling harrow loader-excavator of claim 1, comprising a harrow rotary piece, directional sway and reset harrow teeth, a harrow supporter, a driving mechanism, a feeder mechanism and a body; each directional sway and reset harrow tooth comprises a torsion spring shaft supporting piece, a tooth handle sway limiting piece, a directional sway and reset tooth handle, a directional sway and reset tooth point, a torsion spring tooth handle shaft, a torsion spring and a torsion spring tooth handle shaft retaining piece, wherein the directional sway and reset tooth handle is arranged on a lower portion of the directional sway and reset tooth point; the torsion spring shaft supporting piece is arranged on the rolling harrow rotary piece; the tooth handle sway limiting piece is arranged on the torsion spring shaft supporting piece close to a position of the rolling harrow supporter; a tooth handle rotary hole piece is arranged on the directional sway and reset tooth handle; the torsion spring is arranged in the torsion spring shaft supporting piece; the torsion spring and the tooth handle rotary hole piece are connected, by using the torsion spring tooth handle shaft, to the torsion spring shaft supporting piece in a penetrating manner; the torsion spring tooth handle shaft is positioned on the torsion spring shaft supporting piece by using the torsion spring tooth handle shaft retaining piece; a fixed end of the torsion spring is arranged on the tooth handle sway limiting piece or the torsion spring shaft supporting piece, while a movable end of the torsion spring is arranged on the directional sway and reset tooth handle; a tooth point sway limiting piece is arranged on one side of the directional sway and reset tooth handle; and the tooth handle sway limiting piece and the tooth point sway limiting piece limit each other to prevent the directional sway and reset tooth point from swaying towards a space other than a limiting position of the provided tooth handle sway limiting piece; the rolling harrow rotary piece is hinged to the rolling harrow supporter that is arranged on the body; the feeder mechanism is arranged on the body; the driving mechanism drives the rolling harrow rotary piece to rotate; when materials are clamped between the rolling harrow supporter and the directional sway and reset harrow teeth, the directional sway and reset harrow teeth continue to rotate, and a rotating force drives each tooth handle rotary hole piece to rotate about the corresponding torsion spring tooth handle shaft and simultaneously drives the movable end of the corresponding torsion spring to move, so that the corresponding directional sway and reset tooth point rotates in a direction away from the harrow supporter, and the clamped materials fall off; and when the directional sway and reset harrow teeth rotate and leave a material clamping position between the directional sway and reset harrow teeth and the harrow supporter, the movable end of the torsion spring restores and resets the directional sway and reset tooth point, and then the directional sway and reset harrow teeth continue to rotate for harrowing materials.

4. The rolling harrow loader-excavator with the directional sway and reset harrow teeth of claim 3, wherein a torsion spring positioning sleeve is arranged between the torsion spring tooth handle shaft and the torsion spring, and the torsion spring is arranged on the torsion spring positioning sleeve.

5. The rolling harrow loader-excavator with the directional sway and reset harrow teeth of claim 3, wherein the directional sway and reset tooth handle comprises a torsion spring pretension force adjusting block, torsion spring pretension force adjusting threads and a torsion spring pretension force adjusting screw; the torsion spring pretension force adjusting screw penetrates through the torsion spring pretension force adjusting threads and the torsion spring pretension force adjusting block; the torsion spring pretension force adjusting block is closely affixed to the movable end or the fixed end of the torsion spring; the torsion spring pretension force adjusting screw is rotated to enable the torsion spring pretension force adjusting block to move along the torsion spring pretension force adjusting screw, such that an elastic force of the movable end of the torsion spring is suitable for swaying and resetting the directional sway and reset tooth point towards one side.

6. The rolling harrow loader-excavator with the directional sway and reset harrow teeth of claim 3, wherein the body comprises a shoveling plate that comprises a baffle plate on an upper side portion of the shoveling plate; a sway plane of each directional sway and reset tooth point is arranged relatively perpendicular to the baffle plate on the upper side portion of the shoveling plate; and when materials are clamped between the baffle plate on the upper side portion of the shoveling plate and the directional sway and reset harrow teeth, each directional sway and reset tooth point sways in a direction away from the baffle plate on the upper side portion of the shoveling plate.

7. The rolling harrow loader-excavator with the directional sway and reset harrow teeth of claim 3, wherein a cambered retainer ring is arranged on the rolling harrow supporter; a tooth point sway limiting pin is arranged on each directional sway and reset tooth point and rotates along with the directional sway and reset tooth point; when the directional sway and reset harrow teeth rotate into a material clamping interval between the directional sway and reset tooth points and the rolling harrow supporter, the tooth point sway limiting pins leave the cambered retainer ring, the directional sway and reset tooth points sway in a direction away from the rolling harrow supporter and the clamped materials fall off; and when the directional sway and reset harrow teeth rotate and leave the material clamping interval between the directional sway and reset tooth points and the rolling harrow supporter, the tooth point sway limiting pins rotate into the cambered retainer ring to prevent the directional sway and reset tooth points from swaying in the direction away from the rolling harrow supporter, and the cambered retainer ring controls a harrowing direction of the directional sway and reset tooth points such that the directional sway and reset tooth points keep a rigid state while harrowing materials downwards.

8. The rolling harrow loader-excavator with the directional sway and reset harrow teeth of claim 7, wherein a roller or tooth point sway limiting pin shaft sleeve or bearing is arranged on each tooth point sway limiting pin; and when the tooth point sway limiting pin rotates into the cambered retainer ring, the roller or tooth point sway limiting pin shaft sleeve or bearing rolls in a frictional motion manner along the cambered retainer ring.

9. The rolling harrow loader-excavator with the directional sway and reset harrow teeth of claim 3, wherein the rolling harrow supporter is hinged to the body by using a supporter hinge shaft; when the directional sway and reset harrow teeth harrow relatively large materials and hardly harrow the materials into the feeder mechanism, the directional sway and reset harrow teeth are lifted up by the materials and the rolling harrow supporter is lifted up by the directional sway and reset harrow teeth, and then the rolling harrow supporter rotates around the supporter hinge shaft to prevent the large materials from damaging the directional sway and reset harrow teeth and the driving mechanism.

10. The rolling harrow loader-excavator with the directional sway and reset harrow teeth of claim 3, wherein the rolling harrow supporter includes a rolling harrow loading-excavation supporter or a reciprocating impacting rolling harrow loading and transporting supporter; the reciprocating impacting rolling harrow loading and transporting supporter comprises a reciprocating impact head and an impact power box; the impact power box comprises a reciprocating impact box body, a reciprocating impact power piece and a reciprocating impact guiding piece; the reciprocating impact power piece is arranged in the reciprocating impact box body and connected with the driving mechanism; the reciprocating impact box body supports the reciprocating impact power piece and the reciprocating impact guiding piece; the reciprocating impact head is arranged on the reciprocating impact guiding piece extending out of the reciprocating impact box body; the reciprocating impact power piece drives the reciprocating impact guiding piece; the reciprocating impact guiding piece drives the reciprocating impact head to impact falling materials in a reciprocating manner; the rolling harrow rotary piece is arranged on a lower portion of a side surface of the reciprocating impact box body; one or two ends of the rolling harrow rotary piece are arranged outside the reciprocating impact box body; the directional sway and reset harrow teeth are arranged on the rolling harrow rotary piece outside the reciprocating impact box body; the rolling harrow rotary piece drives the directional sway and reset harrow teeth to rotate; the directional sway and reset harrow teeth rotate and extend out of a surface of the reciprocating impact box to harrow and transport materials impacted off by the reciprocating impact head to the feeder mechanism; the reciprocating impact power piece includes a crank connecting link power piece, a hydraulic power piece or a pneumatic power piece.

11. The rolling harrow loader-excavator with the directional sway and reset harrow teeth of claim 10, wherein the crank connecting link power piece comprises a falling and harrowing crank; a rolling harrow driver is arranged on the falling and harrowing crank; the rolling harrow driver is arranged on the falling and harrowing crank within the reciprocating impact box body or on an end portion of the falling and harrowing crank outside the reciprocating impact box body; the rolling harrower driver comprises a belt driver, a chain wheel driver or a gear driver; the rolling harrow driver drives the rolling harrow rotary piece to rotate and the rolling harrow rotary piece drives the directional sway and reset tooth points to rotate for harrowing materials; when materials are clamped between the reciprocating impact box body and one directional sway and reset tooth point, the directional sway and reset tooth point continues to rotate, and a rotating force drives the directional sway and reset tooth point that drives the movable end of the corresponding torsion spring to move, such that the movable end of the torsion spring sways in a direction away from the reciprocating impact box body; when the directional sway and reset tooth point sways and leaves a material clamping position between the directional sway and reset tooth point and the reciprocating impact box body, the movable end of the torsion spring restores and resets the directional sway and reset tooth point, and the directional sway and reset tooth point continues to rotate for harrowing materials.

12. The rolling harrow loader-excavator with the directional sway and reset harrow teeth of claim 11, wherein a harrow tooth directional-rotating clutch is arranged between the falling and harrowing crank and the rolling harrow driver, or between the rolling harrow rotary piece and the directional sway and reset harrow teeth, or between the rolling harrow rotary piece and the rolling harrow driver or on the rolling harrow driver; when the falling and harrowing crank rotates in a direction to drive the directional sway and reset harrow teeth to harrow materials, the harrow tooth directional-rotating clutch transfers power to the directional sway and reset harrow teeth such that the directional sway and reset harrow teeth rotate to harrow materials; and when a rotating direction of the falling and harrowing crank is opposite to a harrowing direction of the directional sway and reset harrow teeth, the harrow tooth directional-rotating clutch stops transferring power to the directional sway and reset harrow teeth such that the directional sway and reset harrow teeth are in a state of rest.

13. The rolling harrow loader-excavator with the directional sway and reset harrow teeth of claim 3, wherein a harrow tooth holder is arranged on the rolling harrower supporter; the harrow tooth holder comprises a harrow tooth support claw, a support claw supporting shaft and a support claw limiting piece; the support claw supporting shaft and the support claw limiting piece are arranged on the reciprocating impact box body of the impact power box; the harrow tooth support claw is hinged to the support claw supporting shaft; the support claw limiting piece limits the rotating harrow tooth support claw; when the directional sway and reset harrow teeth rotate and harrow materials, the directional sway and reset harrow teeth smoothly rotate and harrow materials through the harrow tooth support claw after the harrow tooth support claw is lifted up a certain angle by the directional sway and reset harrow teeth; and when the directional sway and reset harrow teeth move in a direction opposite to a rotating and harrowing direction, the harrow tooth support claw is limited by the support claw limiting piece to lift up the directional sway and reset harrow teeth, and the directional sway and reset harrow teeth are in the state of rest.

14. The rolling harrow loader-excavator with the directional sway and reset harrow teeth of claim 13, wherein the support claw limiting piece comprises a support claw falling limiting piece and a support claw upturning limiting piece, the two of which are arranged on the reciprocating impact box body; the support claw falling limiting piece prevents the harrow tooth support claw from falling off, while the support claw upturning limiting piece prevents the harrow tooth support claw from rotating to a position where the support claw falling limiting piece is unable to lift up the rolling harrow support claw; the support claw falling limiting piece and the support claw upturning limiting piece are arranged separately or integrally.

15. The rolling harrow loader-excavator with the directional sway and reset harrow teeth of claim 3, wherein the driving mechanism comprises a reciprocating impact driving piece; the rolling harrow supporter includes the rolling harrow loading-excavation supporter or the reciprocating impacting rolling harrow loading and transporting supporter; the reciprocating impacting rolling harrow loading and transporting supporter comprises the reciprocating impact head and the impact power box; the impact power box comprises the reciprocating impact box body and the reciprocating impact power piece; the reciprocating impact power piece comprises a crank, a connecting link, the reciprocating impact guiding piece, a guiding supporting wheel and a reciprocating impact power transmission piece; the reciprocating impact box body supports the guiding supporting wheel; the guiding supporting wheel supports the reciprocating impact guiding piece; the reciprocating impact driving piece drives the reciprocating impact power transmission piece that drives the crank, and the crank drives the connecting link that drives the reciprocating impact guiding piece to reciprocate; the reciprocating impact guiding piece extends out of the reciprocating impact box body and drives the reciprocating impact head to impact falling materials in a reciprocating manner; the reciprocating impact box body supports the reciprocating impact power transmission piece and the crank; the driving mechanism further comprises a harrowing driving piece; the rolling harrow rotary piece is arranged on a lower portion of a side surface of the reciprocating impact box body; a reciprocating impact transmission harrowing power piece is arranged on the reciprocating impact power transmission piece; the harrow tooth directional-rotating clutch is arranged between the reciprocating impact power transmission piece and the reciprocating impact transmission harrowing power piece; the harrowing driving piece drives the reciprocating impact transmission harrowing power piece that drives the rolling harrow rotary piece to rotate, such that the directional sway and reset harrow teeth rotate and extend out of the surface of the reciprocating impact box body to harrow and transport materials impacted off by the reciprocating impact head to the feeder mechanism; the harrowing driving piece is integrated with the reciprocating impact driving piece, and includes a motor driving piece, a hydraulic driving piece or a pneumatic driving piece.

* * * * *